United States Patent
Shotton et al.

(10) Patent No.: US 12,350,116 B2
(45) Date of Patent: Jul. 8, 2025

(54) DEVICE FOR CONTINUOUS IRRIGATION WITH ACTIVATION IN ENDODONTICS APPLICATION

(71) Applicant: DENTSPLY SIRONA Inc., York, PA (US)

(72) Inventors: Vincent Shotton, Broken Arrow, OK (US); Kevin Wilkinson, Bixby, OK (US)

(73) Assignee: Dentsply Sirona Inc., York, PA (US)

(*) Notice: Subject to any disclaimer, the term of this patent is extended or adjusted under 35 U.S.C. 154(b) by 0 days.

(21) Appl. No.: 18/636,650

(22) Filed: Apr. 16, 2024

(65) Prior Publication Data

US 2024/0341933 A1    Oct. 17, 2024

Related U.S. Application Data

(63) Continuation of application No. 18/074,046, filed on Dec. 2, 2022, now abandoned, which is a continuation
(Continued)

(51) Int. Cl.
*A61C 5/40* (2017.01)
*A61C 3/03* (2006.01)
*A61C 17/02* (2006.01)

(52) U.S. Cl.
CPC ............ *A61C 17/0202* (2013.01); *A61C 3/03* (2013.01); *A61C 5/40* (2017.02)

(58) Field of Classification Search
CPC ........... A61C 1/052; A61C 1/055; A61C 5/40; A61C 5/42; A61C 5/50; A61C 1/07;
(Continued)

(56) References Cited

U.S. PATENT DOCUMENTS 5,725,370 A * 3/1998 Himeno ................. A61C 17/20
433/119
8,043,088 B2 * 10/2011 Johnson ................. A61C 17/20
433/224
(Continued)

FOREIGN PATENT DOCUMENTS

CA        3130639 A1      9/2020
EP        1712201 A1 * 10/2006 ............... A61C 5/02
(Continued)

OTHER PUBLICATIONS

FR-2991161-A1 Translation (Year: 2013).*
(Continued)

*Primary Examiner* — Cris L. Rodriguez
*Assistant Examiner* — Luis Ruiz Martin
(74) *Attorney, Agent, or Firm* — SCHWEGMAN LUNDBERG & WOESSNER, P.A.

(57) ABSTRACT

Disclosed herein is a dental device for delivering fluid continuously while activated in an endodontic application. The dental device includes a hollow needle having a tip end and a connector portion; and a handle. One end of the handle is configured to be affixed to the connector portion of the hollow needle. The opposite end of the handle is capable of being attached to an endodontic handpiece or a sonic agitator for the activation. The connector portion includes at least one tube connector that is an integral part of the connector portion of the hollow needle or a plurality of openings on the connector portion to accommodate the hollow needle to a connector. The connector is a modular fluid delivery connector which is removable from the needle such that it can be reused.

14 Claims, 25 Drawing Sheets

Related U.S. Application Data of application No. 16/800,019, filed on Feb. 25, 2020, now abandoned.

(60) Provisional application No. 62/809,899, filed on Feb. 25, 2019.

(58) Field of Classification Search
CPC ........... A61C 3/03; A61C 17/02; A61C 17/06; A61C 19/08
See application file for complete search history.

(56) References Cited

U.S. PATENT DOCUMENTS

| | | | | |
|---|---|---|---|---|
| 8,235,719 | B2 * | 8/2012 | Ruddle | A61C 5/40 433/81 |
| 8,506,293 | B2 * | 8/2013 | Pond | A61C 1/0084 433/119 |
| 2010/0092922 | A1 * | 4/2010 | Ruddle | A61C 5/40 433/216 |
| 2011/0117517 | A1 * | 5/2011 | Bergheim | A61C 5/40 433/81 |
| 2018/0153644 | A1 * | 6/2018 | Bosisio | A61C 5/40 |
| 2020/0268491 | A1 | 8/2020 | Shotton et al. | |
| 2023/0102014 | A1 | 3/2023 | Shotton et al. | |

FOREIGN PATENT DOCUMENTS

| | | | | |
|---|---|---|---|---|
| EP | 3930619 | A1 | 1/2022 | |
| EP | 3930619 | B1 | 10/2024 | |
| FR | 2991161 | A1 * | 12/2013 | ........... A61C 1/0084 |
| JP | 2005073819 | A | 3/2005 | |
| JP | 2009045455 | A | 3/2009 | |
| JP | 2010510828 | A | 4/2010 | |
| JP | 2012085682 | A | 5/2012 | |
| JP | 2022521436 | A | 4/2022 | |
| WO | WO-2014122352 | A1 * | 8/2014 | ............. A61C 17/02 |
| WO | WO-2018081180 | A2 | 5/2018 | |
| WO | WO-2020176438 | A1 | 9/2020 | |

OTHER PUBLICATIONS

WO-2014122352-A1 Translation (Year: 2014).*
"U.S. Appl. No. 16/800,019, Non Final Office Action mailed Jul. 6, 2022", 13 pgs.
"U.S. Appl. No. 16/800,019, Response filed May 16, 2022 to Restriction Requirement mailed Apr. 8, 2022", 2 pgs.
"U.S. Appl. No. 16/800,019, Restriction Requirement mailed Apr. 8, 2022", 6 pgs.
"U.S. Appl. No. 18/074,046, Final Office Action mailed Oct. 17, 2023", 14 pgs.
"U.S. Appl. No. 18/074,046, Non Final Office Action mailed May 24, 2023", 16 pgs.
"U.S. Appl. No. 18/074,046, Response filed May 1, 2023 to Restriction Requirement mailed Apr. 5, 2023", 7 pgs.
"U.S. Appl. No. 18/074,046, Response filed Aug. 21, 2023 to Non Final Office Action mailed May 24, 2023", 10 pgs.
"U.S. Appl. No. 18/074,046, Restriction Requirement mailed Apr. 5, 2023", 7 pgs.
"European Application Serial No. 20712188.0, Communication Pursuant to Article 94(3) EPC mailed Feb. 2, 2023", 9 pgs.
"European Application Serial No. 20712188.0, Communication Pursuant to Article 94(3) EPC mailed Oct. 17, 2023", 5 pgs.
"European Application Serial No. 20712188.0, Response filed Apr. 29, 2024 to Communication Pursuant to Article 94(3) EPC mailed Oct. 17, 2023", 35 pgs.
"European Application Serial No. 20712188.0, Response filed Jun. 8, 2023 to Communication Pursuant to Article 94(3) EPC mailed Feb. 2, 2023", 35 pgs.
"European Application Serial No. 20712188.0, Response to Communication pursuant to Rules 161(1) and 162 EPC filed Apr. 4, 2022", 35 pgs.
"Japanese Application Serial No. 2021-549655, Final Notification of Reasons for Rejection mailed Jan. 6, 2025", W/English Translation, 14 pgs.

* cited by examiner

Before     After

Before

After

Before After

Before    After

Before  After

Before   After

DEVICE FOR CONTINUOUS IRRIGATION WITH ACTIVATION IN ENDODONTICS APPLICATION

CROSS-REFERENCE TO RELATED APPLICATIONS

This patent application is a continuation of U.S. patent application Ser. No. 18/074,046 filed Dec. 2, 2022, which is a continuation of U.S. patent application Ser. No. 16/800,019, filed Feb. 25, 2020, which claims the benefit of and priority to U.S. Provisional Application Ser. No. 62/809,899, filed Feb. 25, 2019, all of which are herein incorporated by reference for all purposes.

FIELD OF THE DISCLOSURE

The present disclosure provides a dental device for delivering fluid continuously while activated in an endodontic application. The dental device includes a hollow needle having a tip end and a connector portion; and a handle. One end of the handle is configured to be affixed to the connector portion of the hollow needle. The opposite end of the handle is capable of being attached to an endodontic handpiece or a sonic agitator for the activation. The connector portion includes at least one tube connector that is an integral part of the connector portion of the hollow needle or a plurality of openings on the connector portion to accommodate the hollow needle to a connector. The connector is a modular fluid delivery connector which is removable from the needle such that it can be reused.

BACKGROUND OF THE DISCLOSURE

Traditionally, in endodontics, the irrigation process occurs by the clinician when placing irrigant (sodium hypochlorite (NaOCl), ethylenediaminetetraacetic acid (EDTA), Qmix, etc.) in a syringe which is then connected to an irrigation needle via a luer lock connection. The clinician thereafter depresses the plunger within the barrel of the syringe manually causing the irrigant to extrude from the irrigation needle within the root canal. The clinician then can use sonic, ultrasonic, manual motion, etc. to agitate the irrigant and facilitate dislodging of debris within the canal as well as allowing the irrigant to go in areas (e.g., tubules) within the canal (via pressurization) in order to disinfect the canal more thoroughly. It is becoming more evident, though, that it is more efficacious when the irrigation and activation occurs simultaneously such that the irrigant is replenished within the canal while the activation is occurring.

U.S. Pat. No. 8,215,958 discloses a method for both irrigating while applying motion within the canal via a metal "stent-like" design. The issue with this design is that the relatively large amount of opening within the stent does not allow for any pressurization of the fluid when exiting the device. Furthermore, since the device is made from Nickel Titanium and thus compressible, this prevents any high level of agitation (i.e. lower frequencies than desirable) due to the increased contact of the device to the canal wall. The "stent-like" design lends to increased fragility and increased risk for the device becoming damaged during use.

U.S Pat. Appl. No. 2017/0258552 and U.S. Pat. No. 9,492,244 describes a system for delivering irrigant under high pressure through a needle placed inside the canal. There is no discussion of the needle having any type of activation though which limits the efficacy of the device and requires much higher pressures of the irrigant to adjust for the lack of activation of the irrigant within the canal.

U.S Pat. Appl. No 2018/0153644 discloses a method for delivering and evacuating irrigant within a root canal during a root canal procedure. There is no mention of any method for agitating the irrigant as the irrigant is being delivered within the root canal. This can again limit the efficacy of the irrigation unless the pressures are much higher which increases the risk of apical extrusion of the irrigant thus potentially introducing toxic chemicals into the blood stream.

U.S. Pat. No. 5,725,370 describes a dental tip to be used with a rotosonic scaler or air scaler with irrigating water for a periodontal or endodontic treatment. The device portion is metallic in order to function at ultrasonic frequencies while being hollow in order to deliver irrigant through it. Furthermore, ultrasonic energy from the tip is most effective when the tip is not dampened. When tips that operate at an ultrasonic frequency (>20 kHz) contact the canal wall, it causes the tip frequency to dampen as well as the tip contact creates ledging which means small notches can be created on the canal wall which further destroys the root canal when contacted by the ultrasonic tip.

U.S. Pat. No. 8,506,293 discloses an endodontic irrigating system that incorporates ultrasonic energy into the irrigating needle used in connection with the instrument for root canal debridement. The system comprises at least one solution reservoir. The reservoirs are connected to one or more handpieces, which have at least one fluid outlet.

U.S Pat. Appl. No 2016/0067023 discloses a device for endodontics by means of continuous ultrasonic irrigation with negative apical suction, consisting of a body made of a rigid plastic material, a threaded steel connection socket attached to the body, a truncated rhomboid connection joint made of plastic, a hollow conduit having a cylindrical section, a circular plastic connection joint, a stainless steel coronal cannula and an apically bored Ni-Ti microcannula.

U.S. Pat. No. 8,043,088 disclose a system for use in simultaneous liquefaction and acoustic debriment of a tooth canal comprising a contra-angle tip assembly being connectable to an ultrasonic hand piece with ultrasonic activation (>20 KHz).

U.S. Pat. Nos. 8,235,719 and 8,328,552 and U.S Pat. Appl. No. 2010/0092922 discloses an endodontic tool that includes a sonic driven activator. A snap-on coupler is adapted to attach the tool to a driver. The driver will vibrate, sonically or ultrasonically, the flexible activator within a root canal of a tooth. The tool can be provided with fluid passages which allow for irrigating reagents to be delivered through the activator. The design of this construct implies that the irrigant is delivered into the device via the handpiece but there is not any disclosure as to how this is accommodated.

U.S. Pat. No. 10,022,203 discloses a handpiece for delivering irrigant while agitating the irrigant. This design shows that the irrigant is delivered into the device via handpiece. The handpiece includes a reservoir to contain the stock of irrigation solution, a pumping and ejecting device with which the irrigation solution can be conveyed from this reservoir into the canal by way of an endpiece. It further also comprises an agitator device for setting in motion an endpiece designed to agitate the irrigation solution present in the root canal.

SUMMARY OF THE DISCLOSURE

There is a continuing need for a device in endodontic root canal treatment wherein the irrigation and activation occurs simultaneously. Also it is desirous, to provide the irrigant pressurized such that a higher velocity of the irrigant contacts the canal walls and enter into more of the irregular anatomy which allows for a more thorough disinfection of the canal.

The present disclosure provides a dental device for delivering fluid continuously while activated in an endodontic application. The dental device includes a hollow needle having a tip end and a connector portion; and a handle. One end of the handle is configured to be affixed to the connector portion of the hollow needle. The opposite end of the handle is capable of being attached to an endodontic handpiece or a sonic agitator for the activation. The connector portion includes at least one tube connector that is an integral part of the connector portion of the hollow needle or a plurality of openings on the connector portion to accommodate the hollow needle to a connector. The connector is a modular fluid delivery connector which is removable from the needle such that it can be reused.

DETAILED DESCRIPTION OF THE DISCLOSURE

The above-mentioned aspects, as well as other aspects, features, and advantages of the present disclosure are described below in connection with various embodiments, with reference made to the accompanying figures.

The term "irrigant" and "fluid" are used interchangeably.

The dental device according the present disclosure is designed to perform the function of both continuous irrigation and activation simultaneously or intermittently in an endodontic application. The irrigant is replenished within the root canal walls while the activation is occurring.

Figure 1:
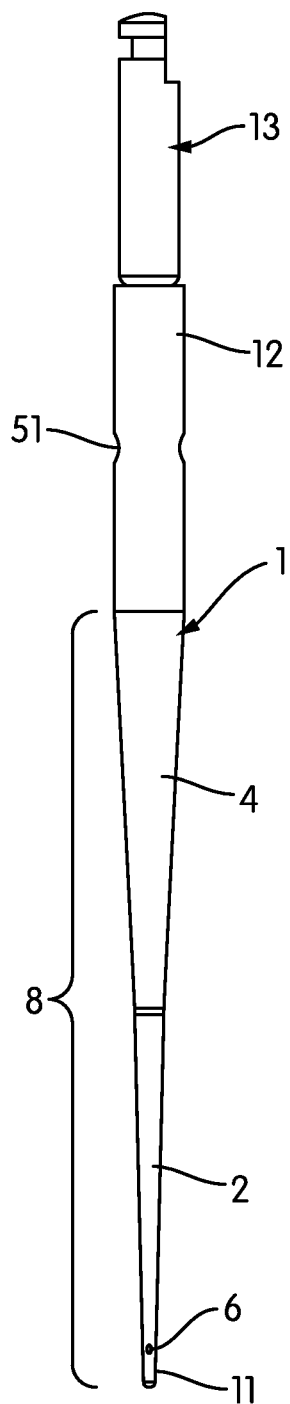
FIG. 1 depicts irrigation needle with handle for endodontic handpiece.
Figure 5:
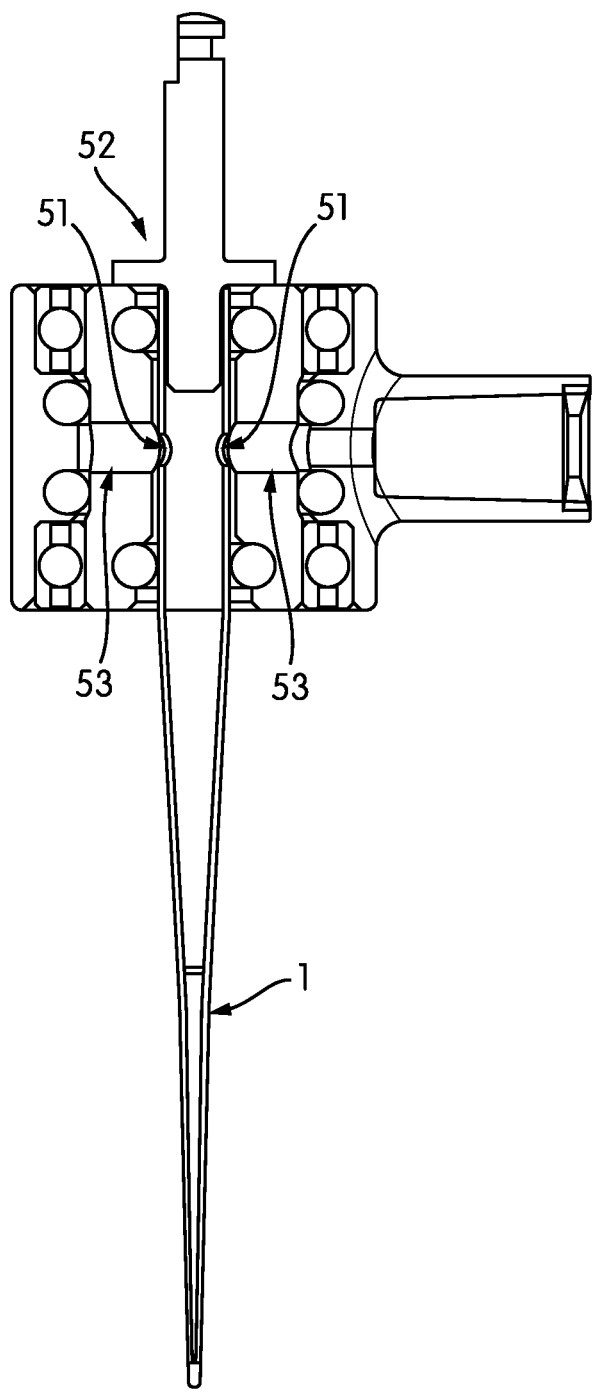
FIG. 5 depicts irrigation needle inside of modular fluid delivery connector.
Figure 6A:
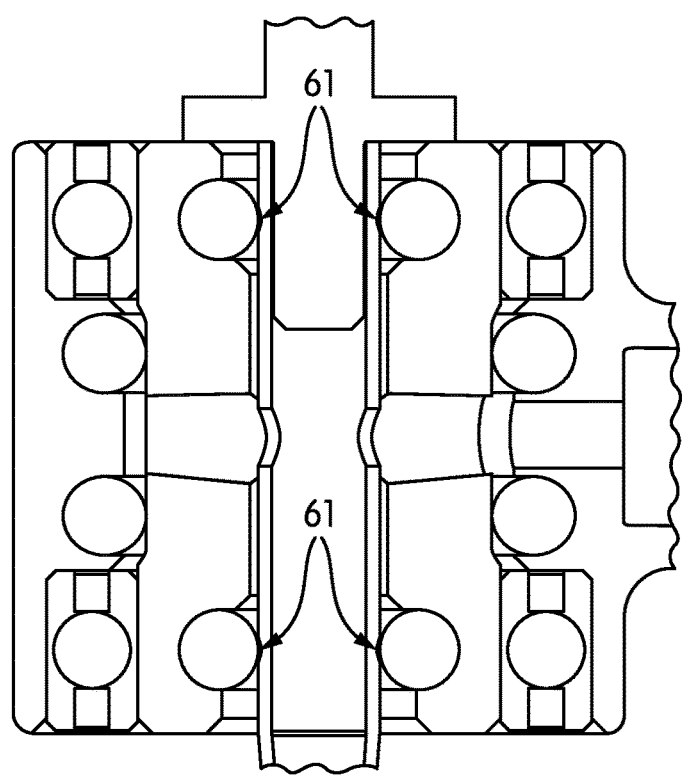
FIG. 6A depicts an irrigation needle inside of modular fluid delivery connector, with arrows pointing to the grooves where the smaller ID O'rings are located.
Figure 6B:
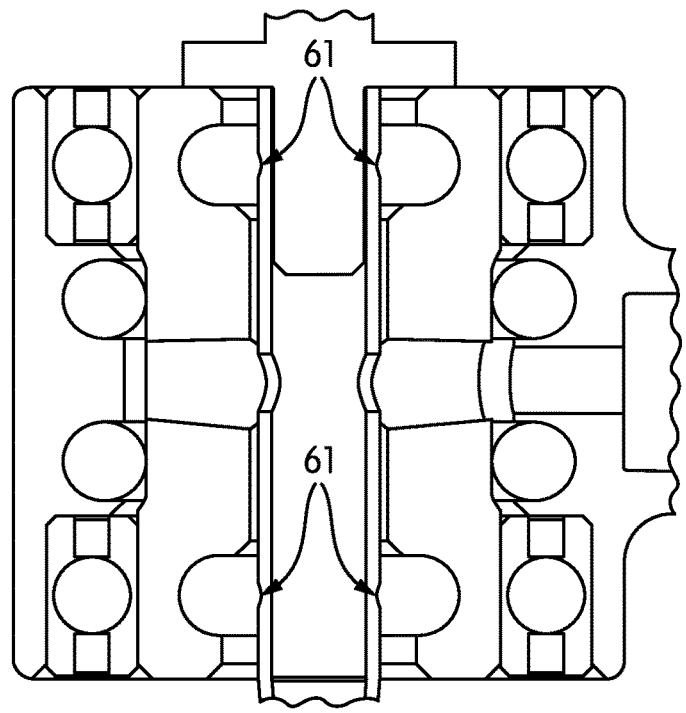
FIG. 6B depicts an irrigation needle inside of modular fluid delivery connector, with arrows pointing to the grooves (without the smaller ID O'rings) configured to accept the smaller ID O'ring in the inner housing of the modular fluid delivery connector.
Figure 19:
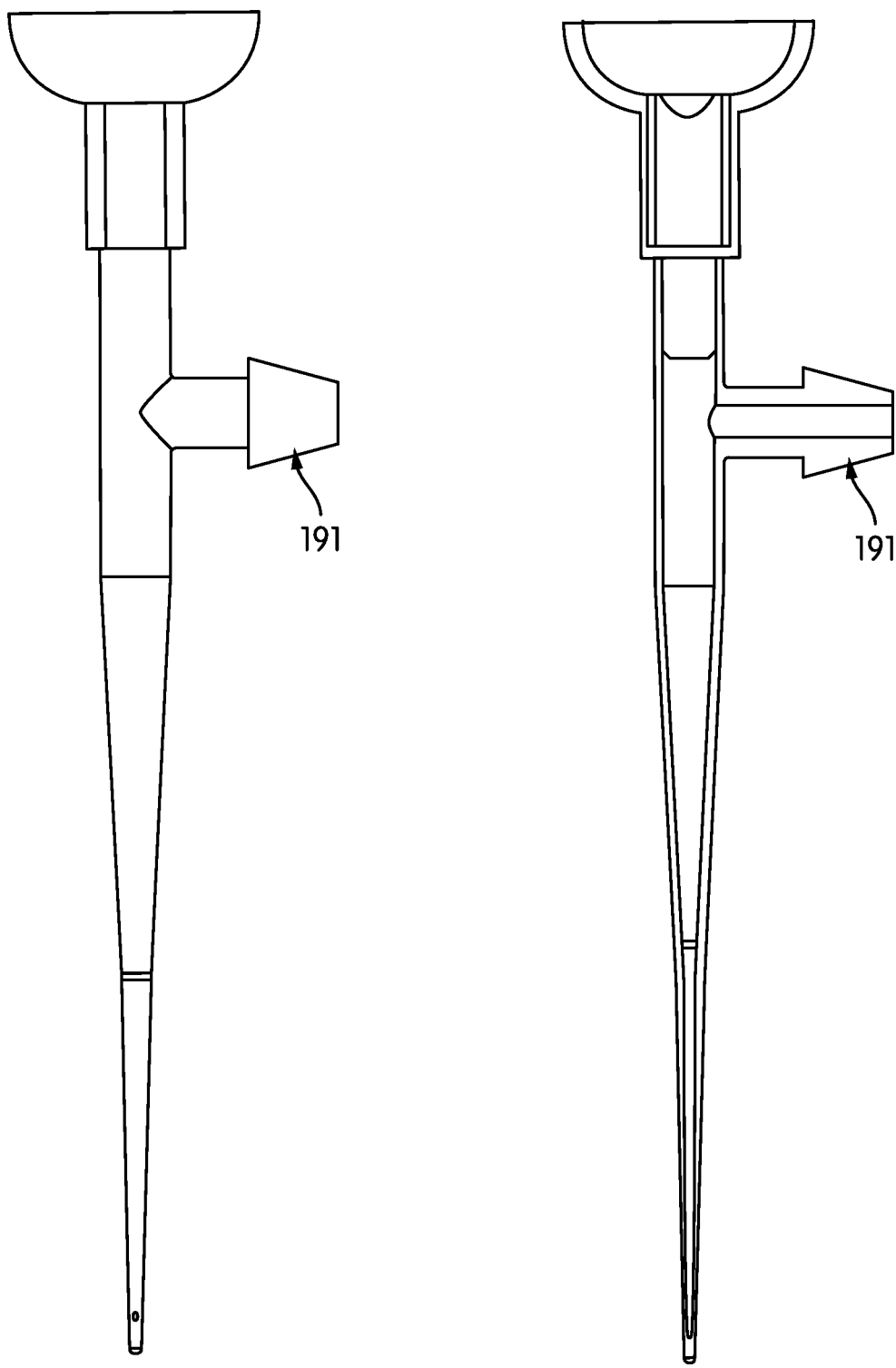
FIG. 19 depicts oscillating irrigation needle (non-rotating) with barbed connector.

The dental device includes a hollow needle (1) having a tip end (11) and a connector portion (12); and a handle (13). The connector portion includes at least one tube connector (191) as shown in FIG. 19 that is integral part of the connector portion of the hollow needle or a plurality of openings on the connector portion (51) as shown in FIGS. 1 and 5. The handle on one end is configured to be affixed to the connector portion of the hollow needle. While the handle on the opposite end is capable of being attached to an endodontic handpiece (14a) or a sonic agitator (14b) for the activation. The hollow needle is connected to a connector. The connector is a modular fluid delivery connector, which is removable from the needle such that it can be reused. The hollow needle may be constructed of plastic, metal (superelastic or non-superelastic), or a composite of both. Preferably, the hollow needle is substantially or completely plastic, though not required.

Figure 2:
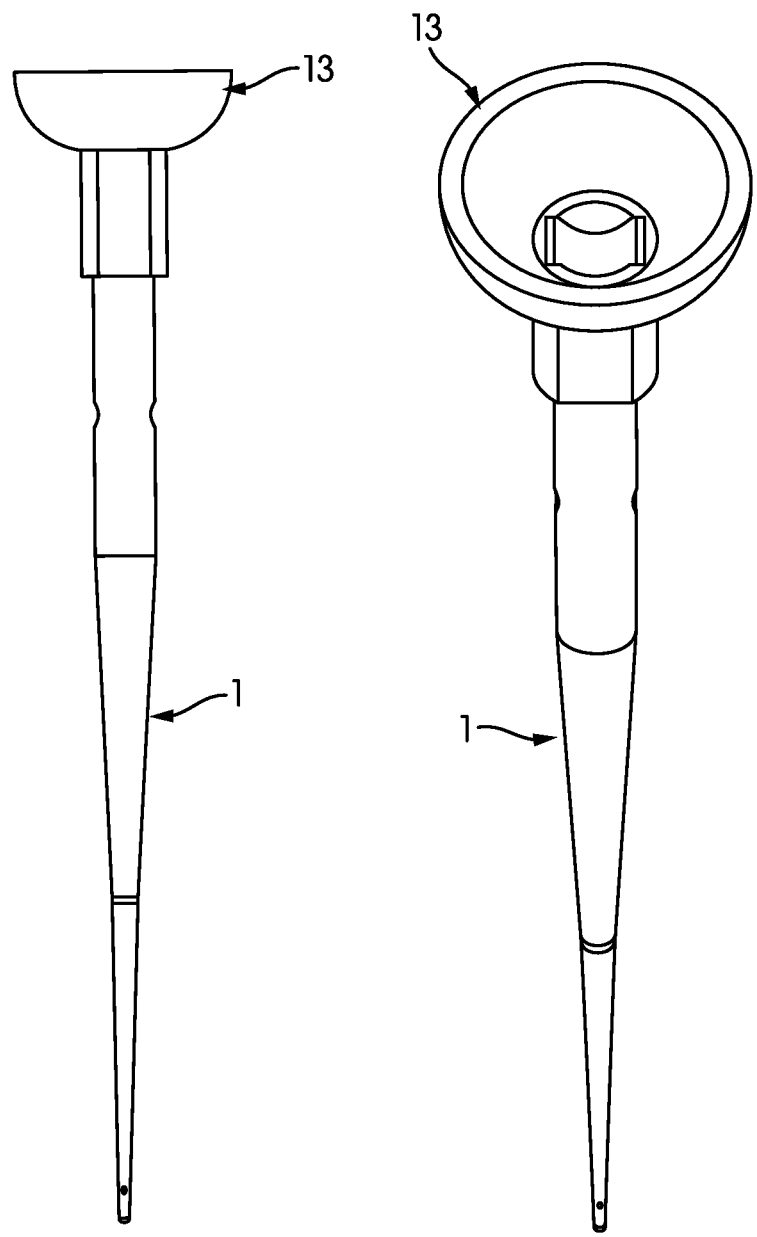
FIG. 2 depicts irrigation needle with handle for sonic handpiece.

A hollow needle with different handle configurations assembled to it, is illustrated in FIGS. 1 and 2. The hollow needle (1) comprises a distal end portion (2), an intermediate portion (4), and a connector portion (12). The distal end portion may have a diameter ranging from 0.20 mm to 0.50 mm. The working portion (8) includes the intermediate portion and the distal end portion. The working portion may be tapered or non-tapered. The taper may be a constant taper or variable taper along its length. The taper range may be from 0% to 10%. The working portion terminates at the tip end (11) and is configured to act on a root canal. The length of the needle for the working portion (8) is a length ranging from 15 mm to 35 mm. The distal end portion, intermediate portion and connector portion are molded together as one piece. The handle is affixed to the connector by methods such as friction fit, ultrasonic welding, overmolding, or adhesive. The needle includes a plurality of openings on the connector portion (51) and at least one opening on the distal end (6) to allow fluid to be delivered through needle. The hollow needle is coupled to a connector; and the handle is capable of being connected to a handpiece (for rotation, reciprocation, and/or otherwise) or a sonic agitator for the activation.

The number of openings on the needle to accept the fluid from the connector may range from approximately 1 to 4. The openings on the needle may have geometries including but not limited to circular, elongated or oval. The diameter of the circular opening may range from 0.1 mm to 1.5 mm. The elongated or oval openings may have a different width than length; for example, a length range from 0.1 mm to 1.5 mm.

The number of openings along the distal and intermediate areas of the needle may range from 1 to 10. The openings along the distal and intermediate areas of the needle may have geometries including but not limited to circular, elongated or oval. The diameter of the circular opening may range from 0.1 mm to 0.8 mm. The elongated or oval openings may have a different width than length; for example, a length may range from 0.1 mm to 0.8 mm.

In some embodiments of the device, the working portion of the irrigation needle includes a plurality of linear fins, a plurality of spiral fins or multiple ports.

Figure 20:
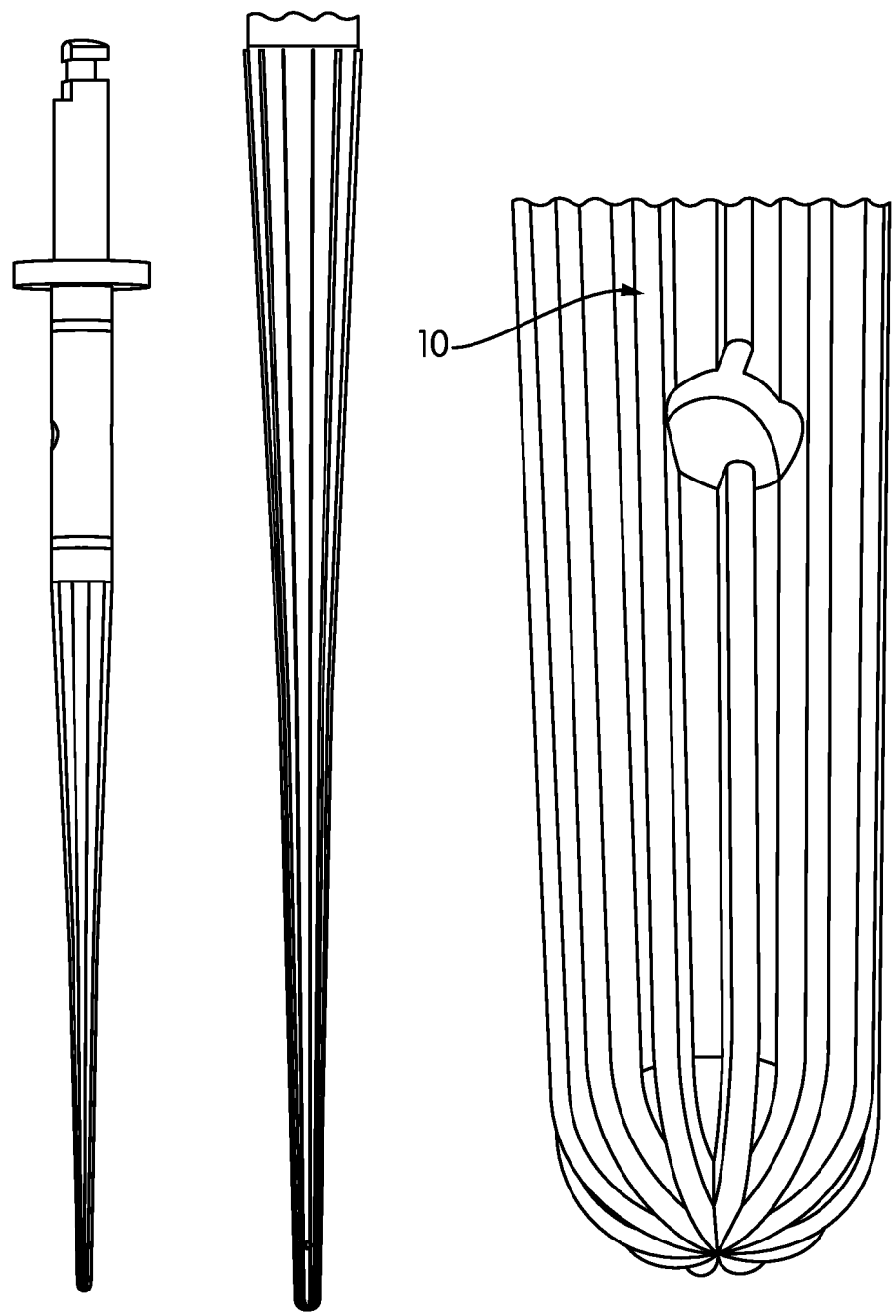
FIG. 20 depicts irrigation needle with linear fins.

In one embodiment of the irrigation needle, the plurality of linear fins (10) may extend radially and longitudinally from a circumferential surface along the intermediate portion and terminating at the tip end of the distal portion as shown in FIG. 20.

In one particular embodiment of the irrigation needle, the linear fins may be made of be same material as needle or overmolded with a different material that is more flexible.

Figure 21:
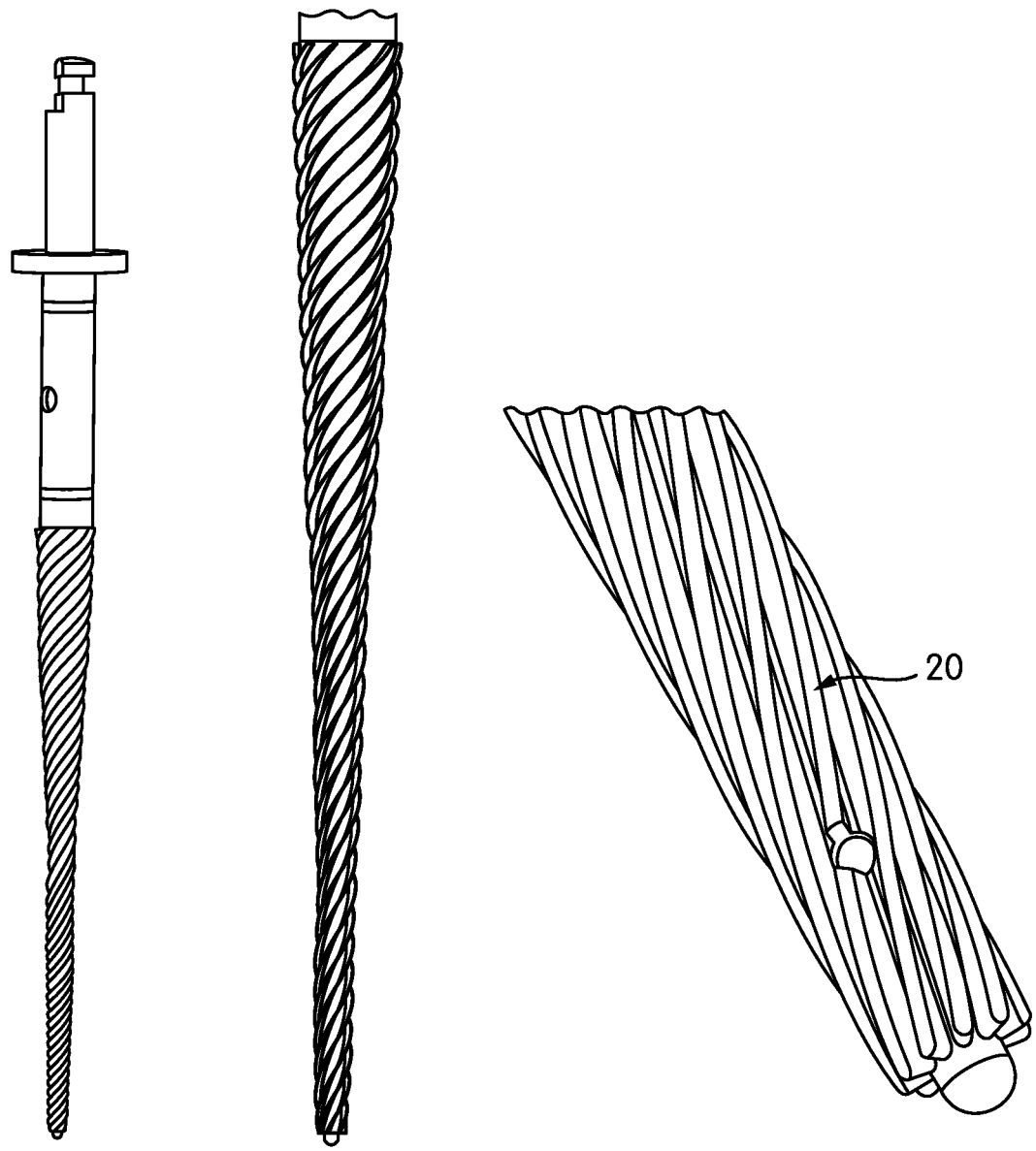
FIG. 21 depicts irrigation needle with spiral fins.

In one embodiment of the irrigation needle, the plurality of radially extending, spiral fins (20) may extend on an outer surface of the working portion of the irrigation needle as shown in FIG. 21.

Figure 22:
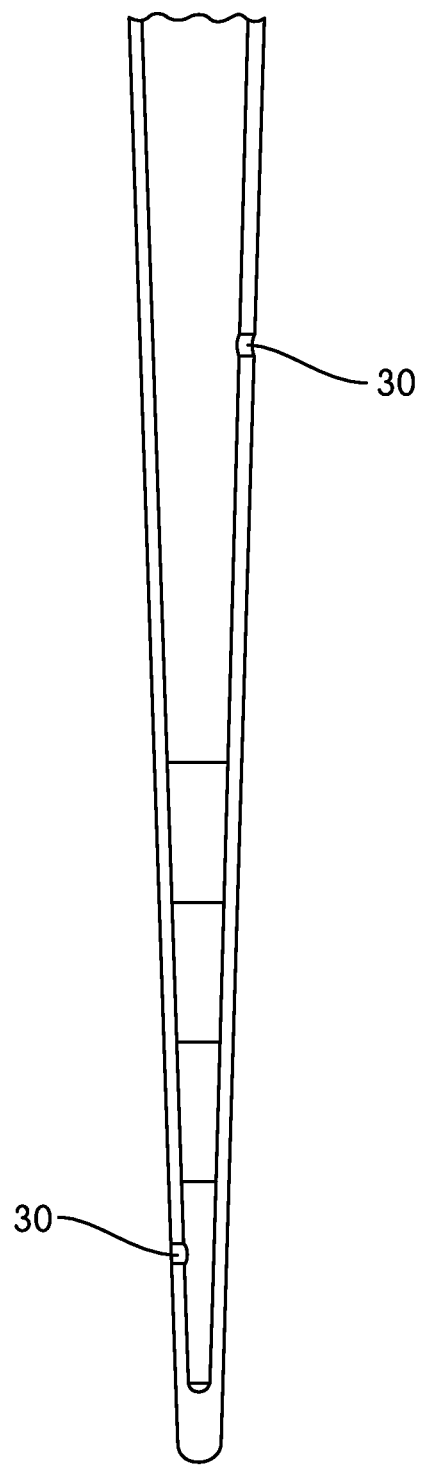
FIG. 22 depicts irrigation needle with multiple ports.
Figure 23:
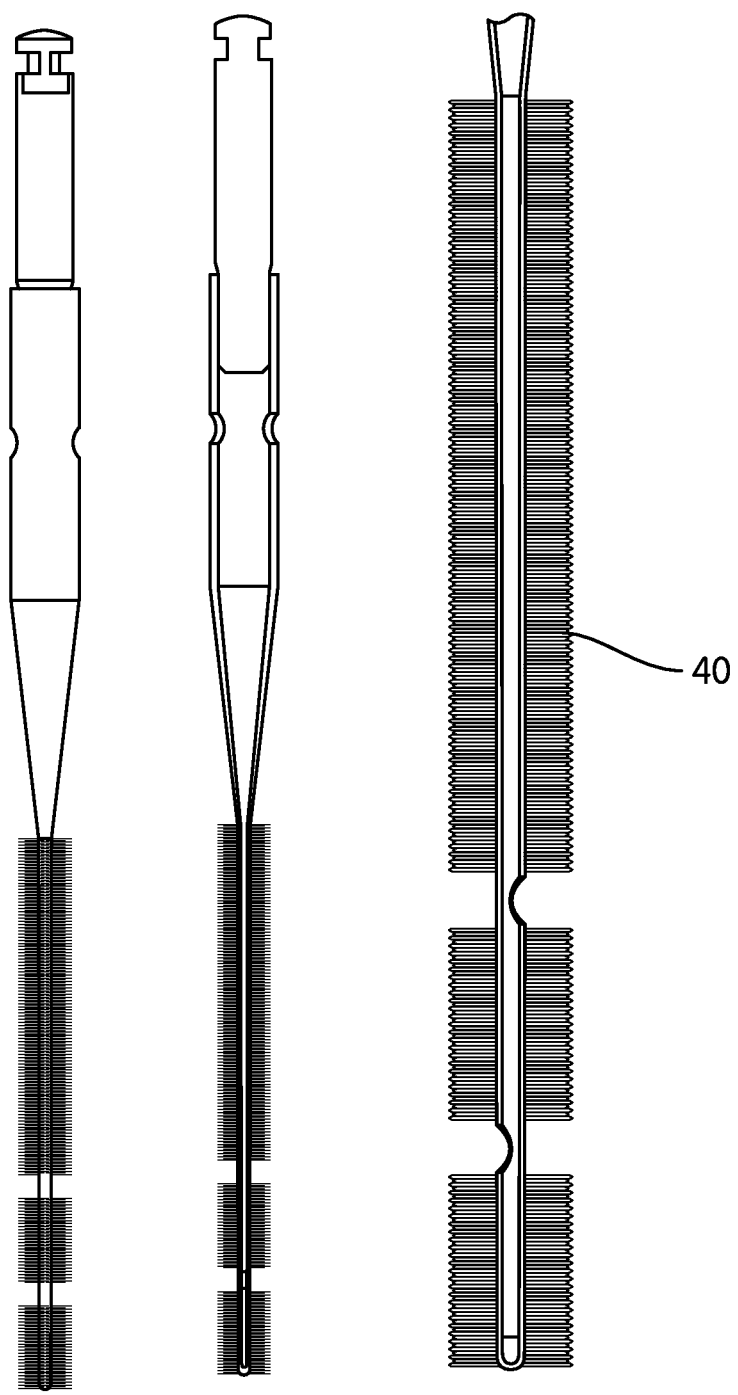
FIG. 23 depicts irrigation needle with brushes.

In one embodiment of the irrigation needle, the irrigation needle may have multiple ports (30) along the working portion where a center channel within the irrigation needle delivers fluid simultaneously at these multiple ports as shown in FIG. 22. The advantage to having multiple ports in the needle is that different areas of the canal can be cleaned simultaneously without having to move the needle up and down within the canal. Furthermore, by having the irrigation ports closer to the canal wall, it allows for higher fluid velocities and pressures to be applied to the canal wall for a more thorough cleaning of the root canal.

In one embodiment of the irrigation needle, the working portion of the irrigation needle includes brushes (40). The brushes are located on the outer surface of the distal portion of the needle. The bristles on the brush may be made from nylon, polyester, acrylonitrile butadiene styrene (ABS), polyacetal, or any other moldable plastic, or any combination thereof.

In some embodiments, both the handle and needle may be made from the same type of material (e.g., plastic) and bonded together via different methods such as ultrasonic welding, adhesive, threads, etc.

In one particular embodiment of the disclosure, the plastic material made for the needle and handle may be the same. The needle and handle may be injection molded with materials such as polypropylene, polyethylene, nylon, polyoxymethylene, etc.

In one embodiment of the irrigation needle, the irrigation needle generally extends along an axis 70. The working portion of the irrigation needle includes an elongated non-linear portion 71. The elongated non-linear portion includes an offset portion 72. At least a portion of the non-linear portion extends along an axis different from the needle axis thereby becoming generally non-linear.

Figure 24A:
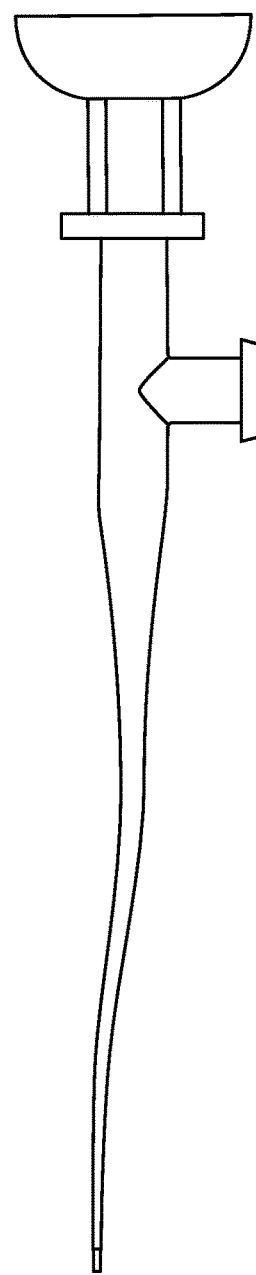
FIG. 24A depicts irrigation needle with C-shape working portion extending in two-dimensional space.
Figure 24B:
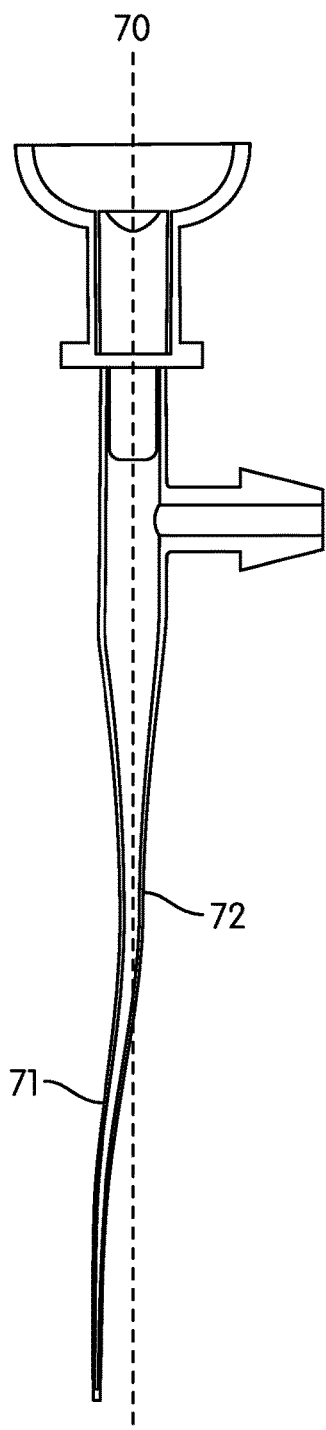
FIG. 24B depicts cross section of irrigation needle with C-shape working portion extending in two-dimensional space.

In one particular embodiment, the non-linear portion extends within a two-dimensional space as shown in FIG. 24A and FIG. 24B.

More particularly, in one specific embodiment, the working portion of the irrigation needle is offset from the needle axis resulting in a general C-shape. The offset portion may include a section of the non-linear portion that generally extends between two locations along the needle axis. For example, the offset portion may extend between a first location where the non-linear portion begins to extend away from the needle axis and a second location wherein the non-linear portion returns to the needle axis. The offset portion may include a crest. The crest may be an outermost point within the corresponding offset portion along the non-linear portion having the greatest distance from the needle axis. This distance between the crest and the needle axis may be defined by the crest displacement distance. Furthermore, the tip end may remain offset from needle axis 70 or may return to axis 70 and extend therefrom.

Figure 24C:
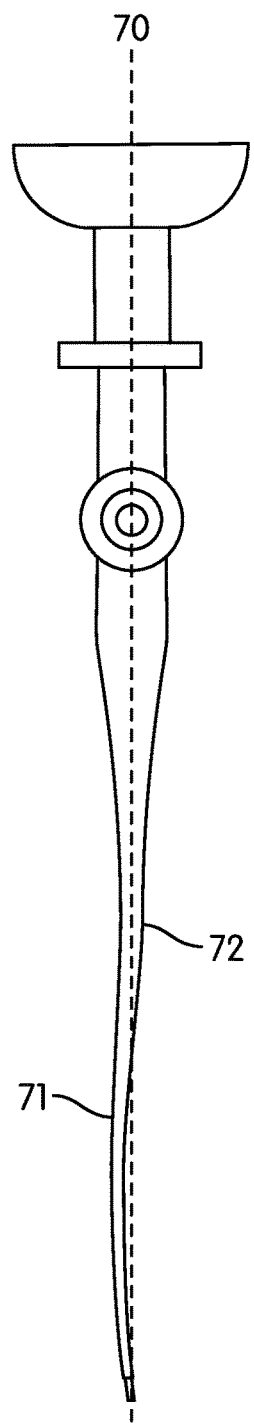
FIG. 24C depicts irrigation needle with C-shape working portion extending in three-dimensional space.

In another embodiment, the non-linear portion 71 extends within a three-dimensional space, that is, offset to the needle axis 70 in multiple planes as shown in FIG. 24C. More particularly, the non-linear portion 71 may extend from the needle axis in at least two different planes (for example cork-screw like shape). The non-linear portion may include at least one offset portion including a first offset portion and a second offset portion, each of the first offset portion and the second offset portion being displaced from the needle axis such that the first offset portion of non-linear portion and the needle axis 70 defines a first plane and the second offset portion defines a second plane different from the first plane. Each offset portion may include a crest and a corresponding crest displacement. The crest displacement decreases from one offset portion to another offset portion, the closer the offset portion may be relative to the tip end of the irrigation needle.

The nonlinear portion 71 may be displaced from the needle axis 70 along the offset portion 72 in an amount greater than about 0.5 mm, preferably less than about 5 mm and more preferably about 1-2 mm.

In one embodiment according to the present disclosure the connector is a modular fluid delivery connector. The modular fluid delivery connector is removable from the needle such that it can be reused.

Figure 3:
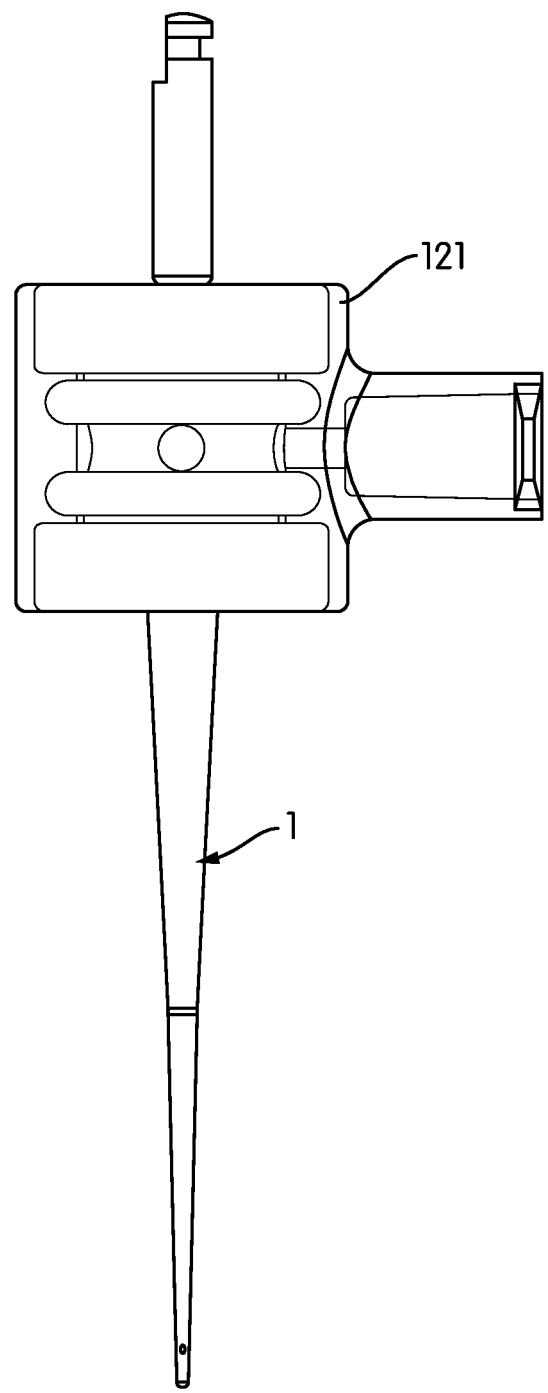
FIG. 3 depicts irrigation needle with modular fluid delivery connector.
Figure 4A:
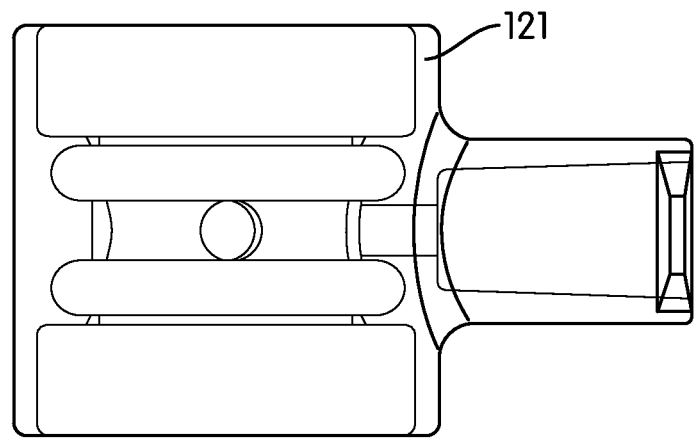
FIG. 4A demonstrate modular fluid delivery connector.
Figure 4B:
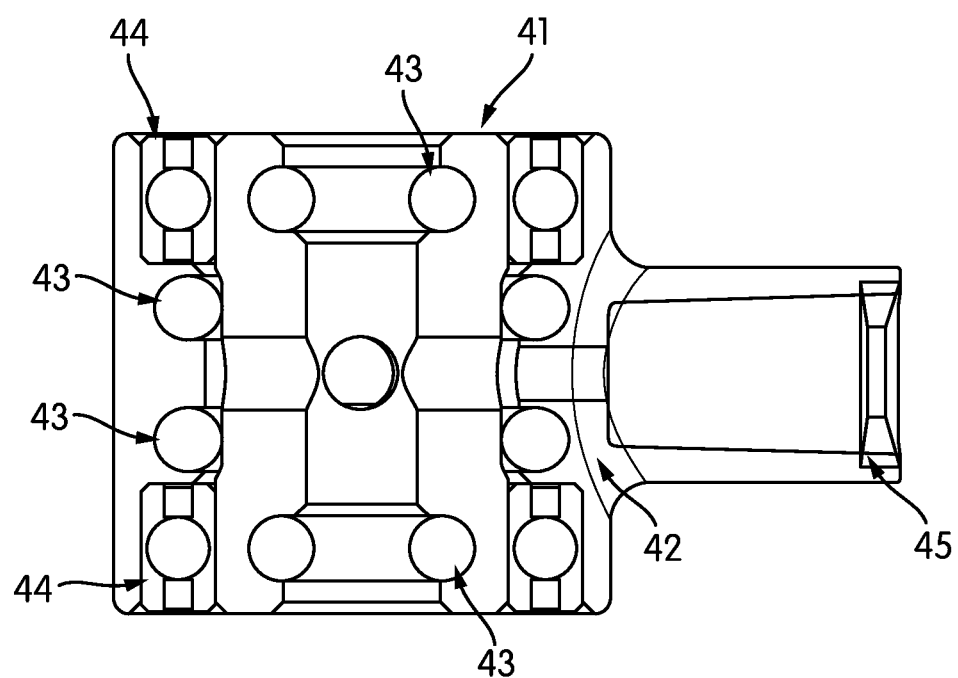
FIG. 4B depicts a cross-section of the modular fluid delivery connector.
Figure 4C:
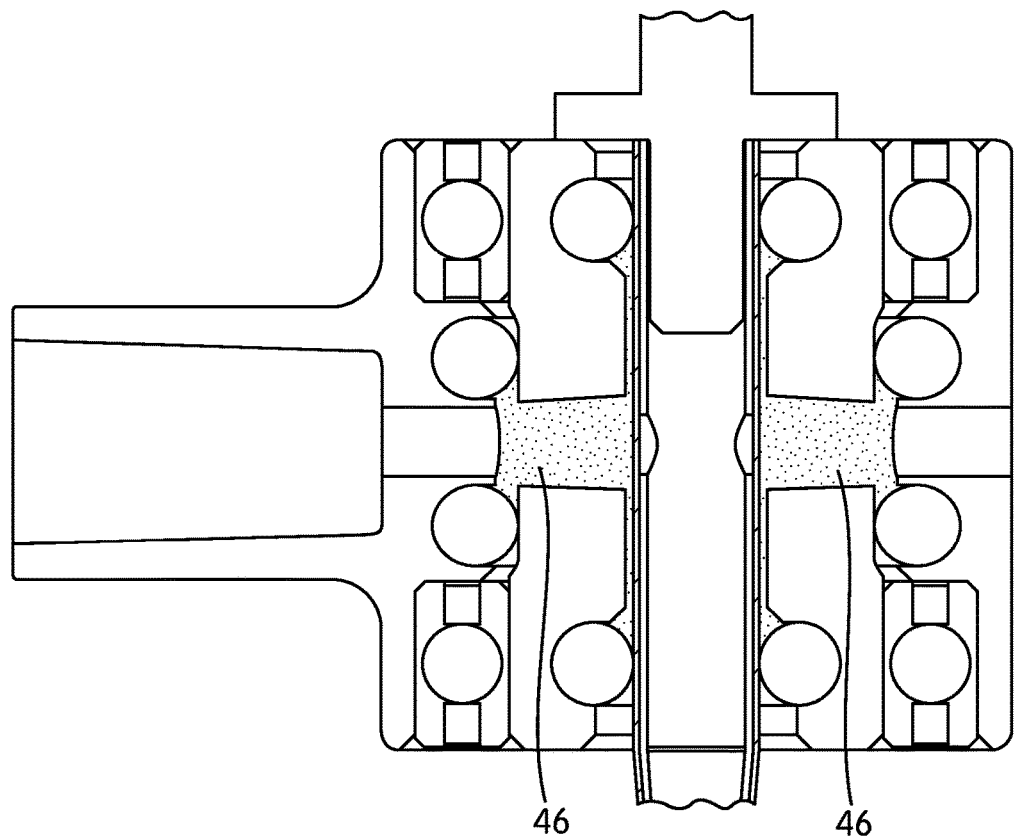
FIG. 4C depicts location of a fluid chamber within the modular fluid delivery connector.
Figure 4D:
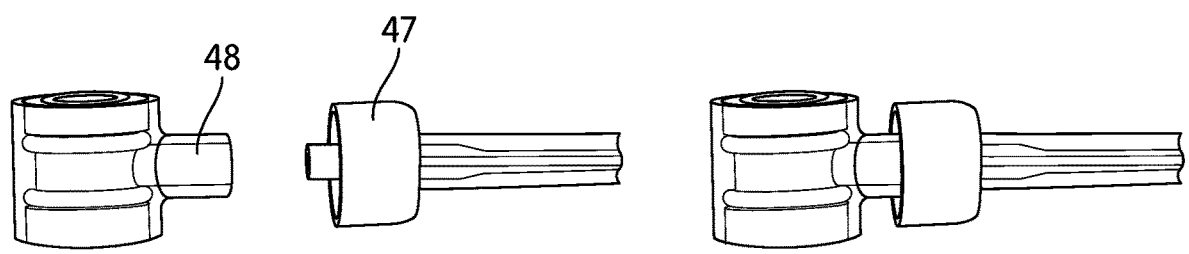
FIG. 4D depicts attachment of male luer lock connector to female luer lock connector of the outer housing.

FIGS. 3-6 show the modular fluid delivery connector and its relationship to the irrigation needle. FIG. 3 shows the modular fluid delivery connector (121) assembled to the device over the connector portion (12) of the needle when in use for delivering fluid. Specifically, FIG. 4A depicts modular fluid delivery connector. FIG. 4B provides a cross-section of the modular fluid delivery connector (121) having an inner housing (41), an outer housing (42); at least two sets of O rings (43) and at least two ball bearing assemblies (44). The at least two set of O rings includes a smaller ID O ring set and a larger ID O ring set. A smaller ID O'ring set is configured to seal the irrigation needle to the inner housing of the modular fluid delivery connector. As depicted in FIG. 6A, that is the cross-section of the modular fluid delivery connector with needle inside it, (with arrows pointing to the grooves (61) where the smaller ID O'rings are located), the smaller ID O'rings seal the irrigation needle to the inner housing. FIG. 6B depicts that the hollow needle includes grooves (61) configured to accept the smaller ID O rings in the inner housing of the modular fluid delivery connector. The larger ID O'ring set is configured to seal the inner housing and outer housing. At least two ball bearing assemblies are used to align the inner and outer housing and allow them to freely rotating about each other. The ball bearings help keep the compression of the O'rings and seal between the inner and outer housing consistent. If the ball bearings are not present, the inner housing may become cantilevered to the outer housing thus compromising the O'ring compression causing leaking of irrigant in the connector. As shown in FIG. 4B, the outer housing has a luer lock connection (45) which allows irrigant to be delivered from within the luer lock connector to the outer housing and then to the inner housing. As shown in FIG. 4D, tubing containing a male luer lock connector (47) is attached to the female luer lock connector (48) of the outer housing. The inner housing (in FIG. 4C) further includes a fluid chamber (46) configured to deliver pressurized fluid through the number of opening within the irrigation needle.

FIG. 5 illustrates connector portion (12) of irrigation needle inside of the modular fluid delivery connector. Small holes (51) in the irrigation needle accept the irrigant from the inner housing. The handle (13) includes a stop (52) helps align the connector with the needle by preventing the user from placing the modular fluid delivery connector any higher past the handle when the modular fluid delivery connector is assembled to the hollow needle. In doing so, the fluid delivery conduits (53) of the modular fluid delivery system from the inner housing is aligned (and sealed) to one or more holes (51) of the needle.

In certain embodiment of the dental device, the inner and outer housings of the modular fluid delivery connector may be made from stainless steel metal or plastic injection molded or a combination of both.

In embodiments, the method to deliver irrigant to the connector can be a number of different ways including: manually via a syringe connected to tubing which is connected to the connector, a syringe within a syringe pump where the flow rate of the irrigant can be dictated by the syringe pump, or a reservoir with tubing connected to the device. The reservoir or syringe or syringe pump can be activated manually or electronically. If electronically activated, there is a pump or motor that drives and pressurizes the fluid to be delivered to the device at a given flow rate.

Figure 7:
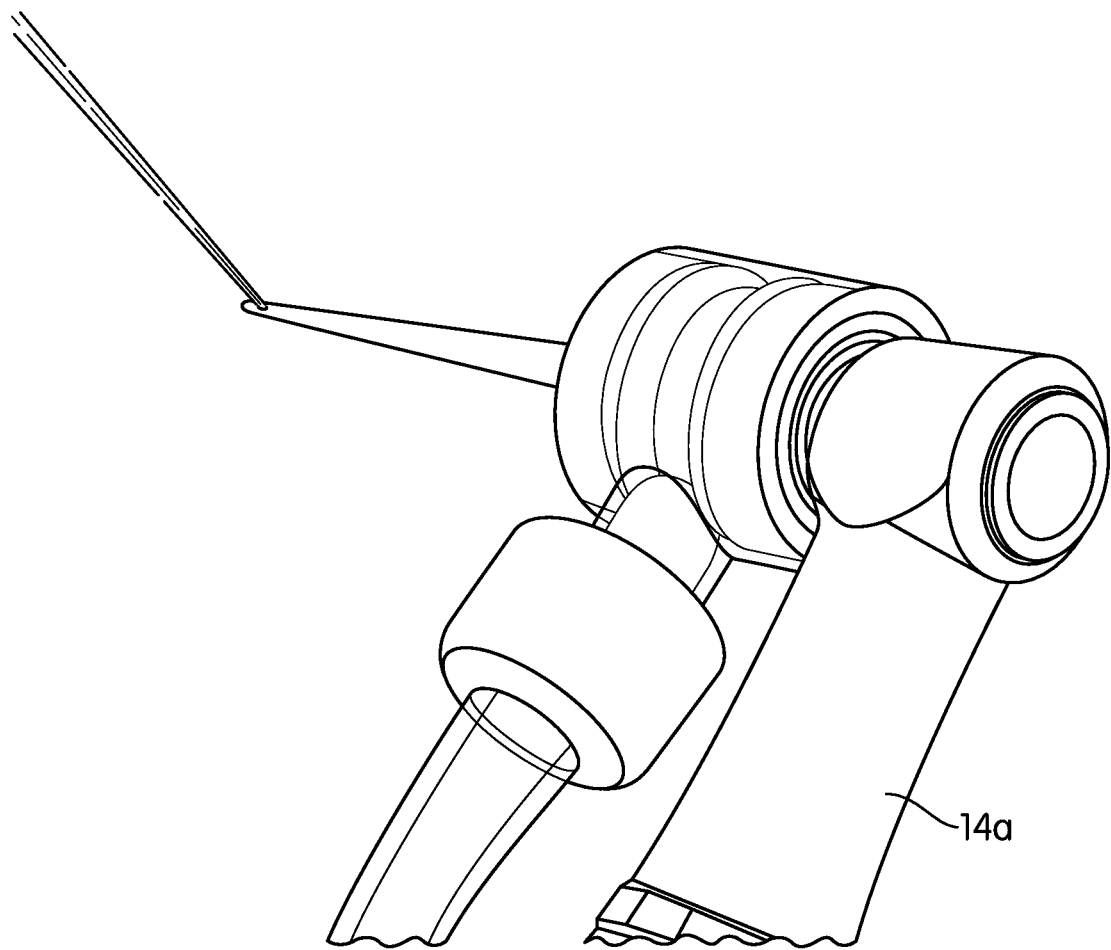
FIG. 7 depicts an irrigation needle with modular fluid delivery connector delivering irrigant.
Figure 8:
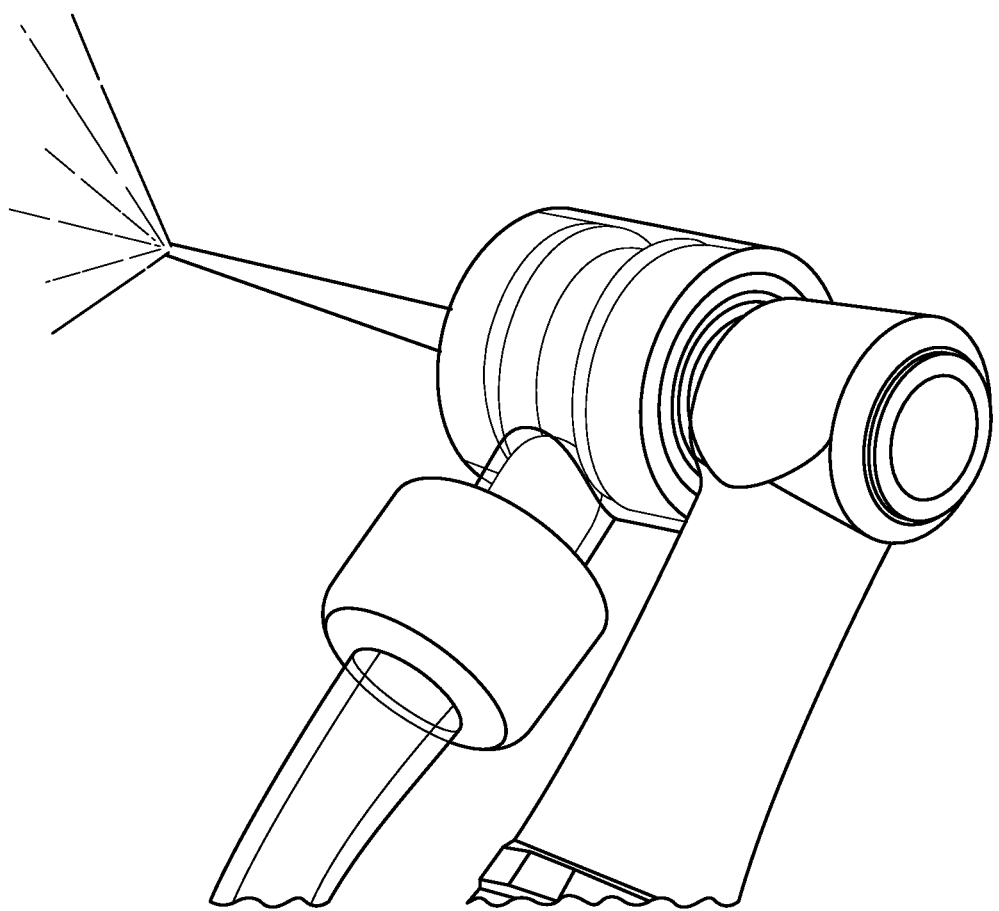
FIG. 8 depicts an irrigation needle with modular fluid delivery connector delivering irrigant at 500 RPM.
Figure 9:
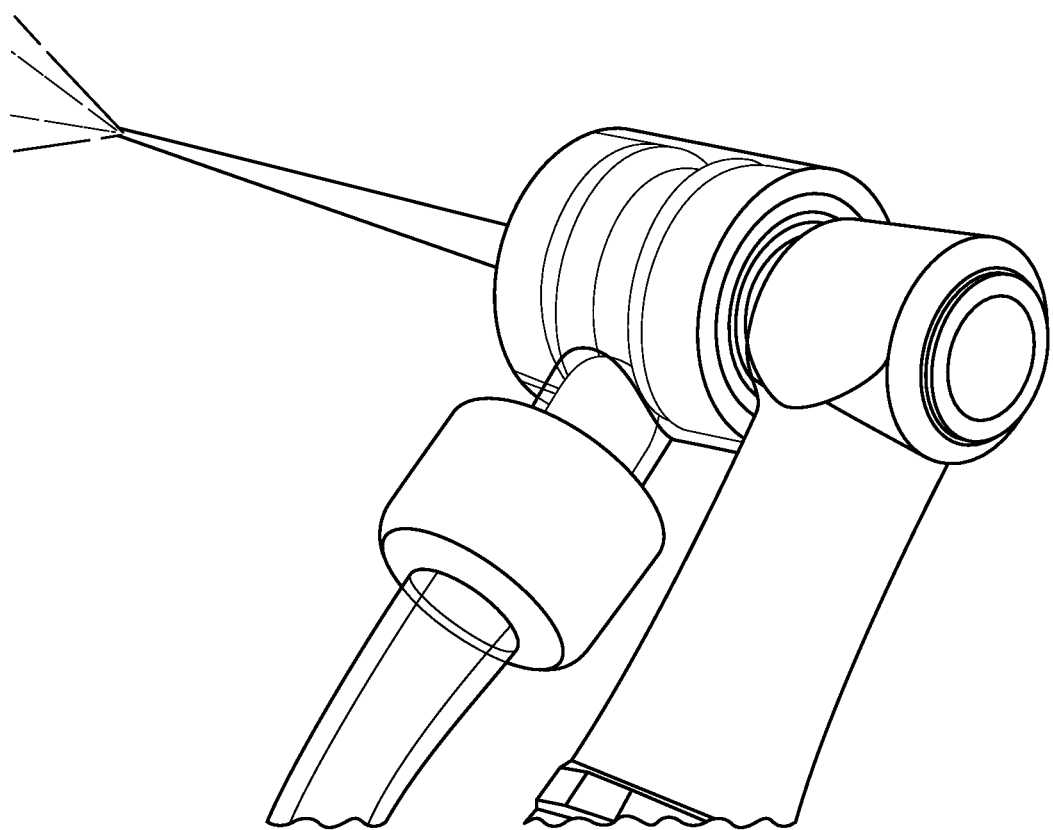
FIG. 9 depicts an irrigation needle with modular fluid delivery connector delivering irrigant at 1000 RPM.

FIGS. 7-9 show various examples of the irrigation needle with modular fluid delivery connector connected to an endodontic handpiece (14a) with irrigant being delivered from the irrigation needle. The handle is connected to the handpiece using a standard connector where the handle is designed per ISO 1797-1 and the handpiece is designed per ISO 3964. When the motor is turned on, the handpiece is activated thus causing the irrigation needle to rotate at a certain speed. These figures also show how the irrigant is disbursed when the irrigation needle is rotating at different RPM's (FIG. 8 500 RPM, and FIG. 9 1000 RPM). The irrigant is delivered at a relatively low pressure from within the luer lock connector of the outer housing to the inner housing of the connector. The inner housing (FIG. 4C) further includes a fluid chamber (46, shown as the volume of space between the smaller O'rings and the hollow needle and the larger O'rings and the inner housing) configured to deliver relatively higher pressurized fluid through the number of openings within the irrigation needle. The faster the rotation speed, the increase in dispersion of the irrigant radially from the axis of rotation of the irrigation needle. It is contemplated that the higher the rotation speed, the higher the velocity of the fluid being expressed for the same flow rate of irrigant.

Figure 10:
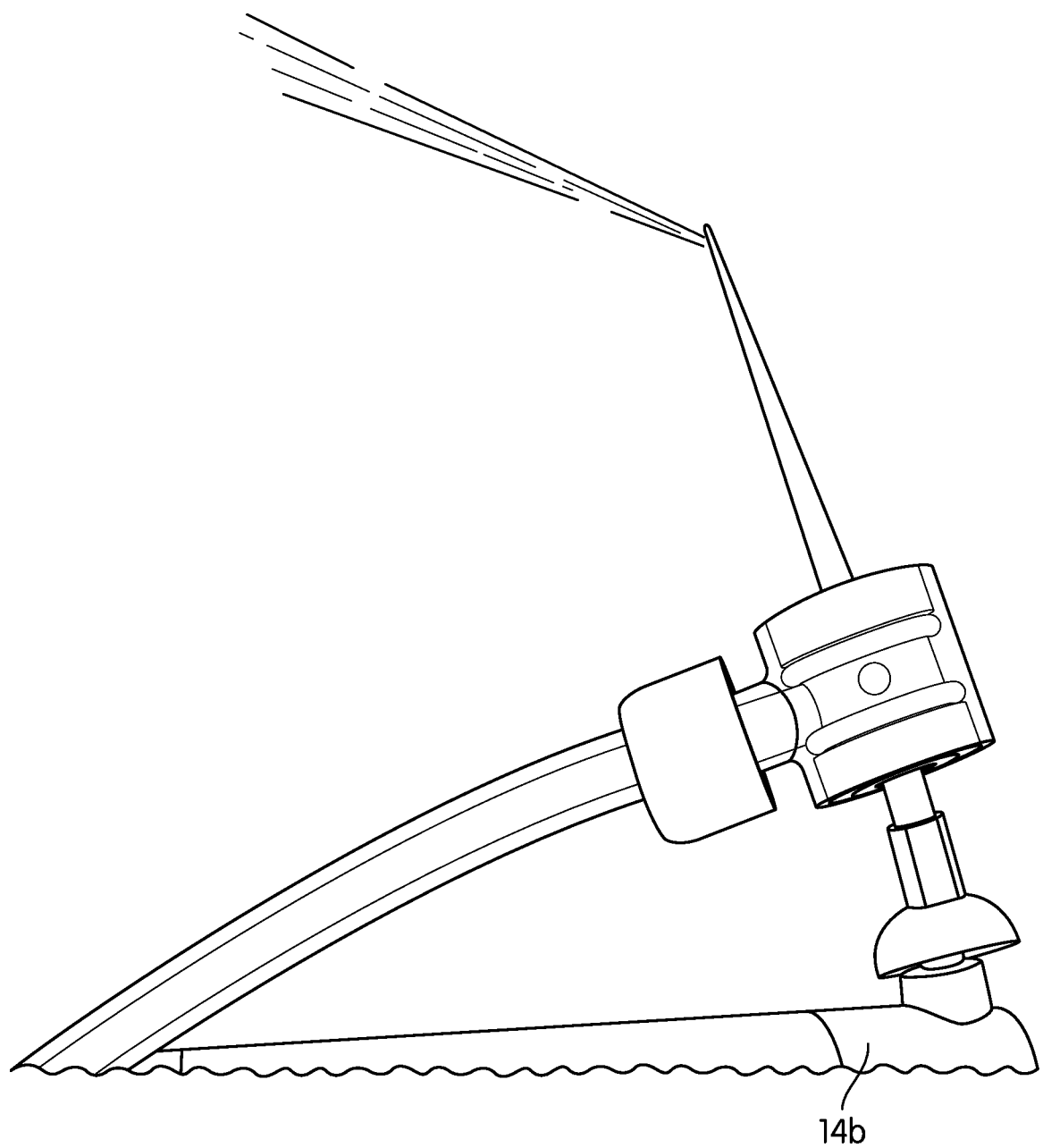
FIG. 10 depicts an irrigation needle with modular fluid delivery connector delivering irrigant with sonic agitator.
Figure 11:
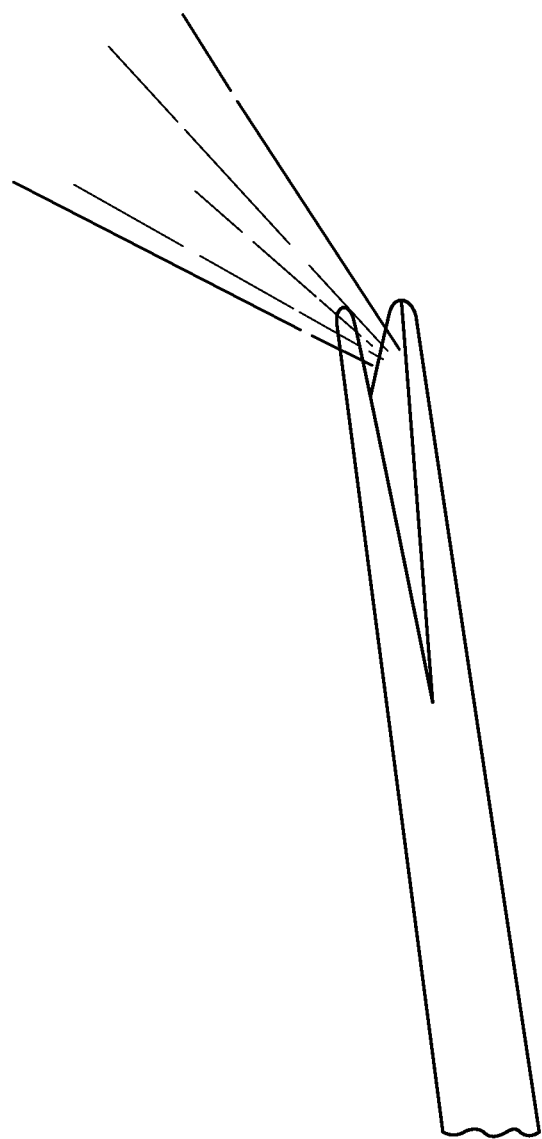
FIG. 11 depicts an irrigation needle with modular fluid delivery connector delivering irrigant with sonic agitator.

FIGS. 10-11 show examples of the irrigation needle with modular fluid delivery connector connected to a sonic agitator (14b) with irrigant being delivered from the irrigation needle. This also shows how the irrigant is disbursed when the irrigation needle is oscillating at a frequency of about 180 Hz (FIG. 11). It is further contemplated that the higher the frequency of the oscillation, the higher the velocity of the fluid being expressed for the same flow rate of irrigant.

Figure 12:
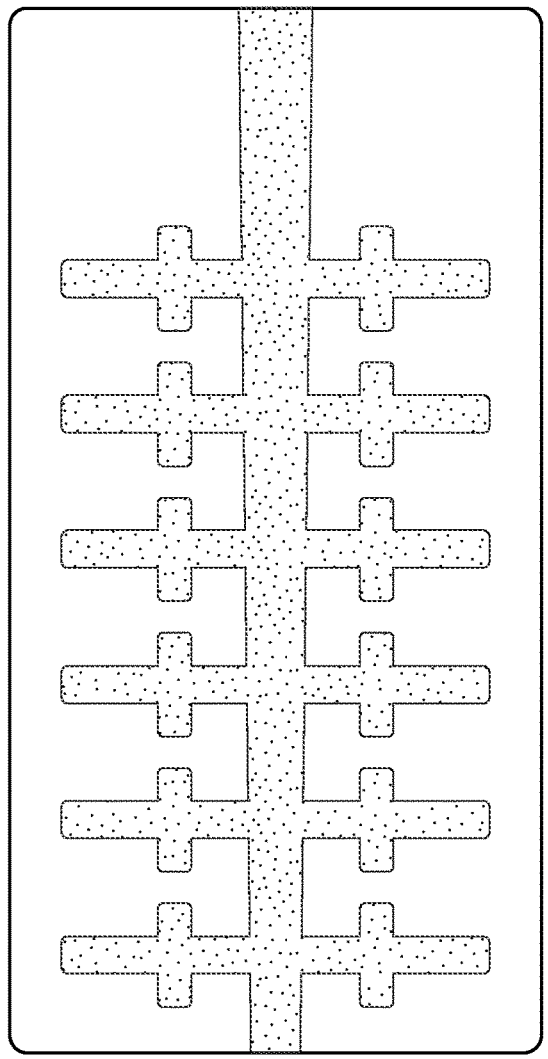
FIG. 12 depicts rotating irrigation needle at 1000 RPM and irrigant flow rate of 15 ml/min for 1 minute in simulated canal.
Figure 12:
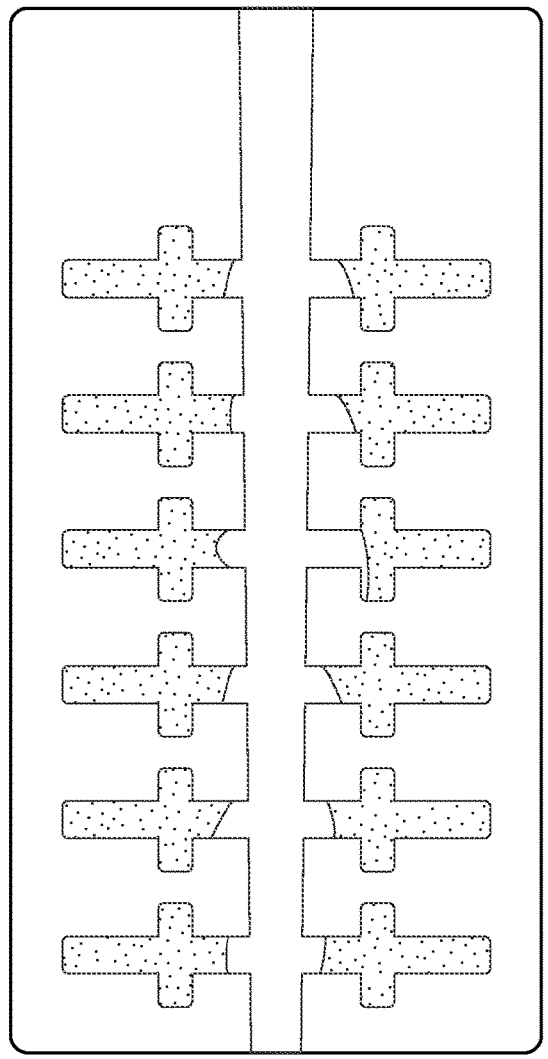
Figure 13:
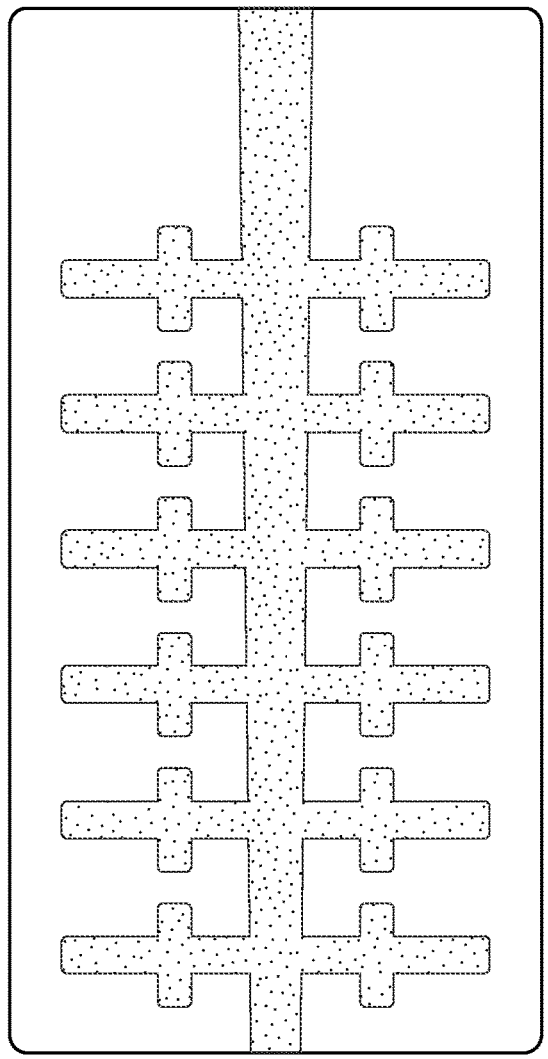
FIG. 13 depicts rotating irrigation needle at 1000 RPM and no continuous irrigation for 1 minute in simulated canal (irrigant applied at the beginning, after 30 seconds, and after 1 minute to remove debris).
Figure 13:
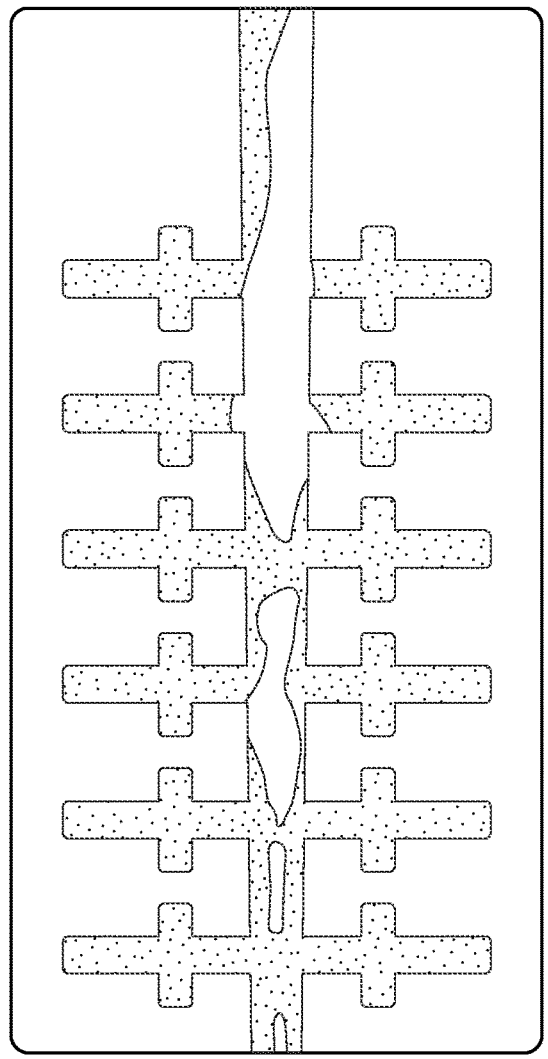
Figure 14:
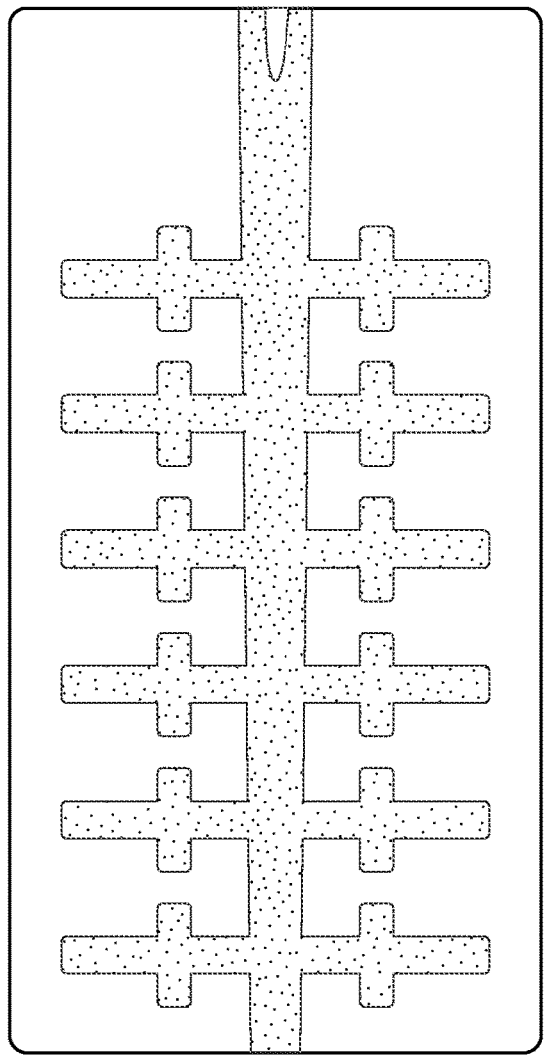
FIG. 14 depicts rotating irrigation needle with continuous irrigation at 15 ml/min and no rotation for 1 minute in simulated canal.
Figure 14:
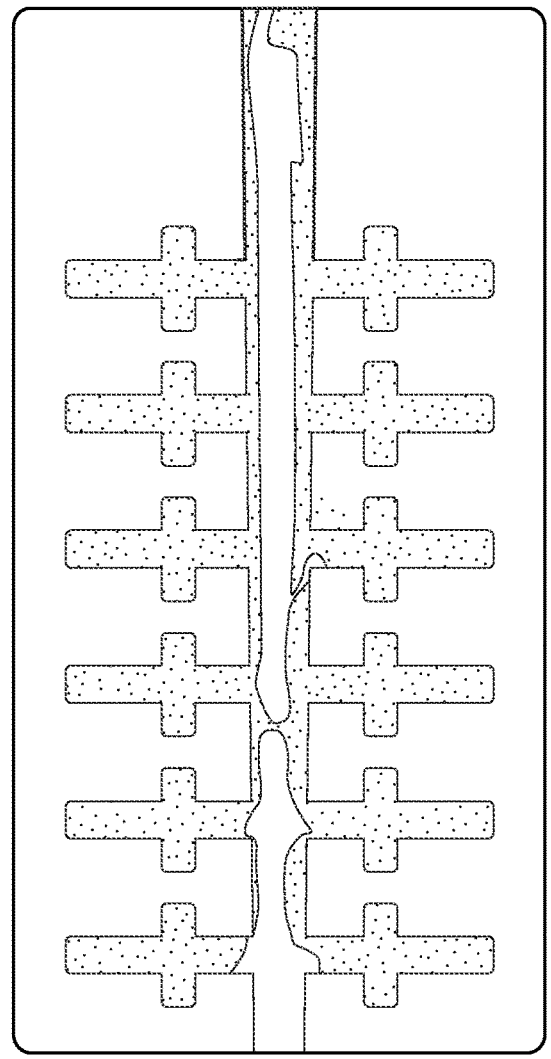

FIGS. 12-14 compare the rotating irrigation needle at different conditions (rotation and irrigation (FIG. 12), rotation only (FIG. 13), and irrigation only (FIG. 14) in a simulated canal filled with silicone gel to simulate debris. For example, in FIG. 12, the irrigation needle is rotating at 1000 RPM and irrigant flow rate of 15 mL/min for 1 min in simulated canal filled with silicone gel. FIG. 13 depicts rotating irrigation needle with continuous irrigation at 15 ml/min and no rotation for 1 minute in simulated canal (Irrigant applied at the beginning, after 30 seconds, and after 1 minute to remove debris). FIG. 14 illustrates that the irrigation needle is not rotating with continuous irrigation at 15 mL/min only for one minute in a simulated canal. The results in comparing these three scenarios show visually that combining irrigation with rotation is most optimal in cleaning the canal as compared to rotation only or irrigation only.

Figure 15:
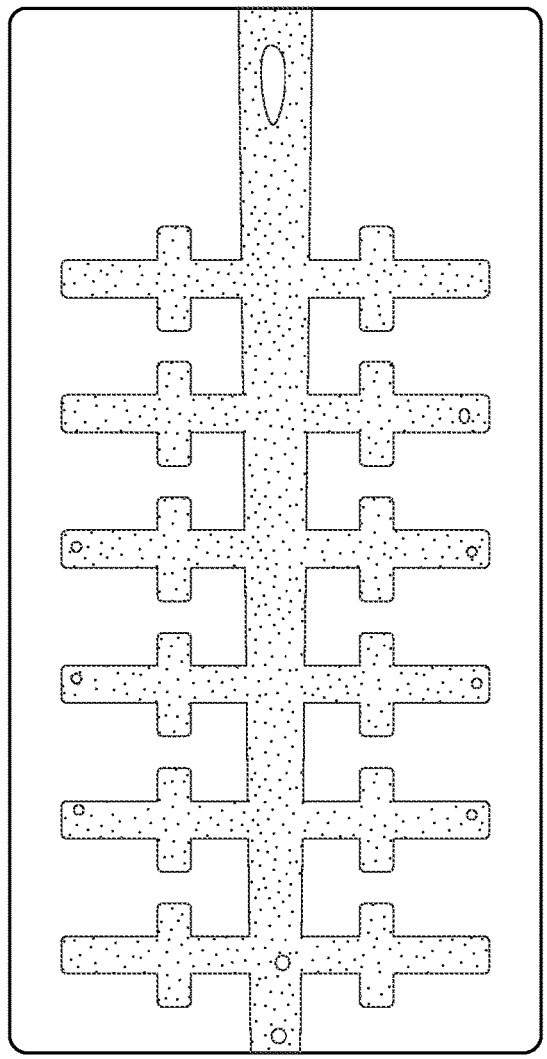
FIG. 15 depicts sonic activated needle at 180 Hz and irrigant flow rate of 14 ml/min for 1 minute in simulated canal.
Figure 15:
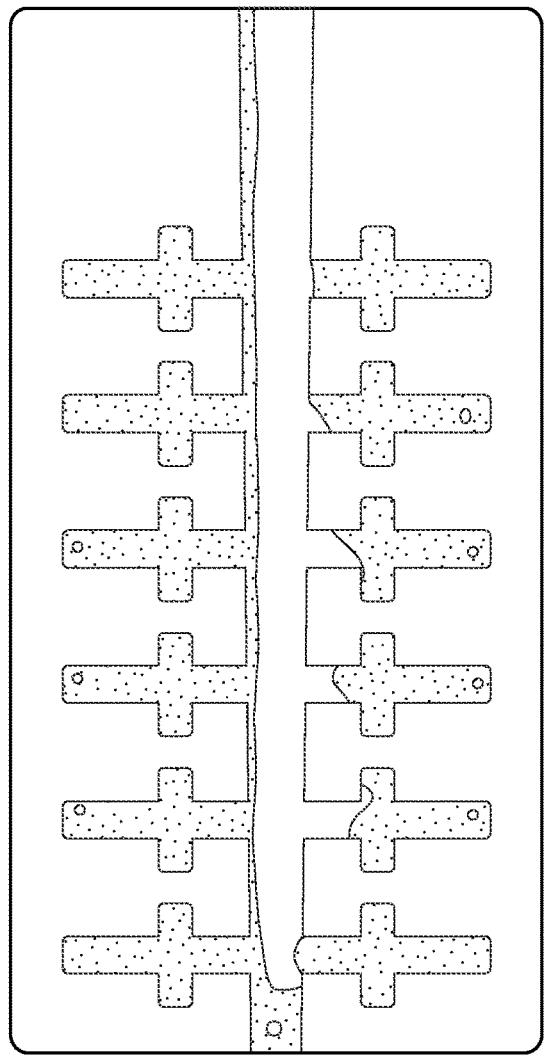
Figure 16:
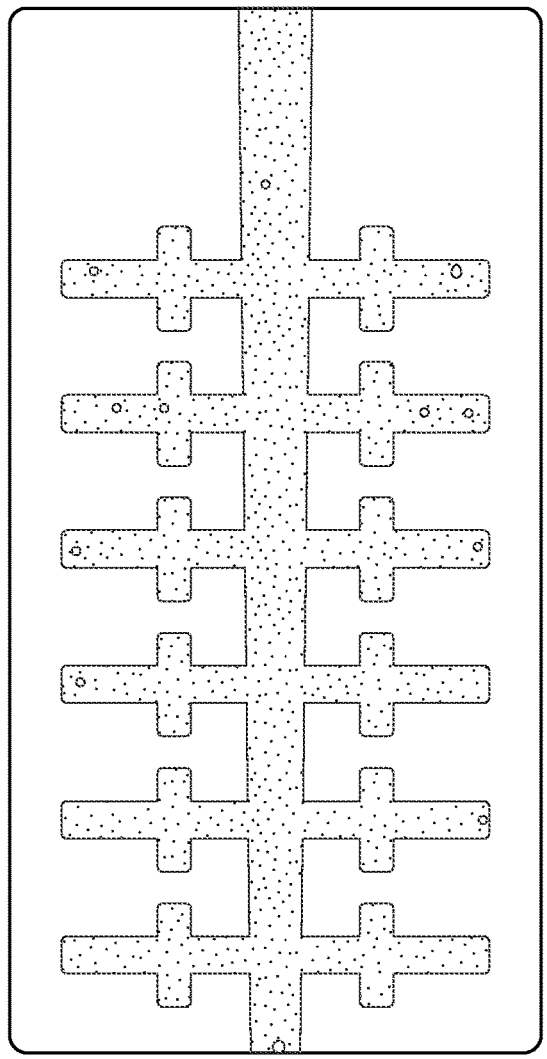
FIG. 16 depicts sonic activated irrigation needle at 180 Hz and no continuous irrigation for 1 minute in simulated canal (irrigant applied at the beginning, after 30 seconds, and after 1 minute to remove debris).
Figure 16:
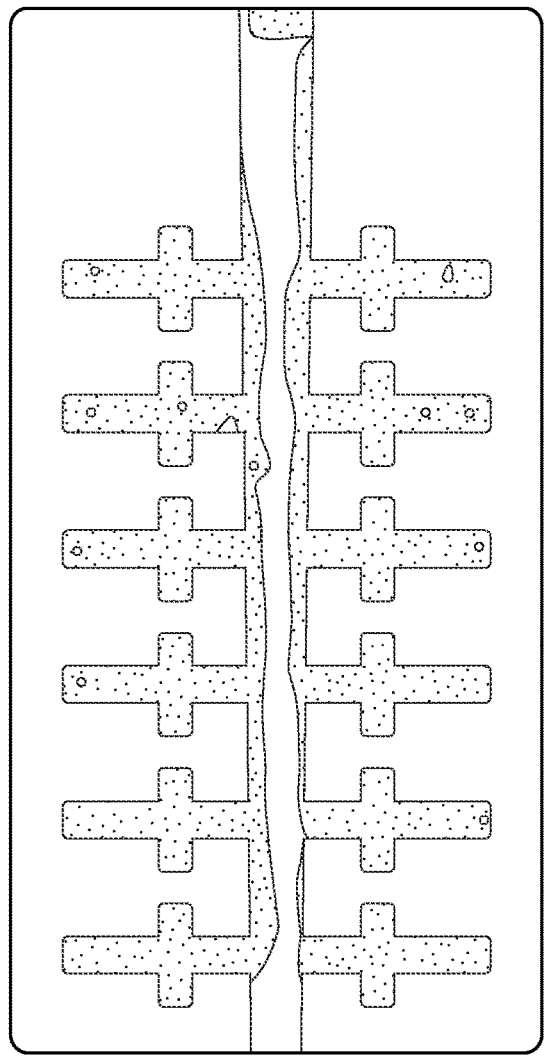

FIGS. 15-16 compare the oscillating irrigation needle at different conditions (oscillation and irrigation (FIG. 15) and oscillation only (FIG. 16) in a simulated canal filled with silicone gel to simulate debris. FIG. 15 depicts sonic activated needle at 180 Hz and irrigant flow rate of 14 ml/min for 1 minute in simulated canal. FIG. 16 depicts sonic activated irrigation needle at 180 Hz and no continuous irrigation for 1 minute in simulated canal (irrigant applied at the beginning, after 30 seconds, and after 1 minute to remove debris). The results in comparing these two scenarios shows visually that combining irrigation and oscillation is most optimal in cleaning the canal as compared to oscillation only.

Figure 17:
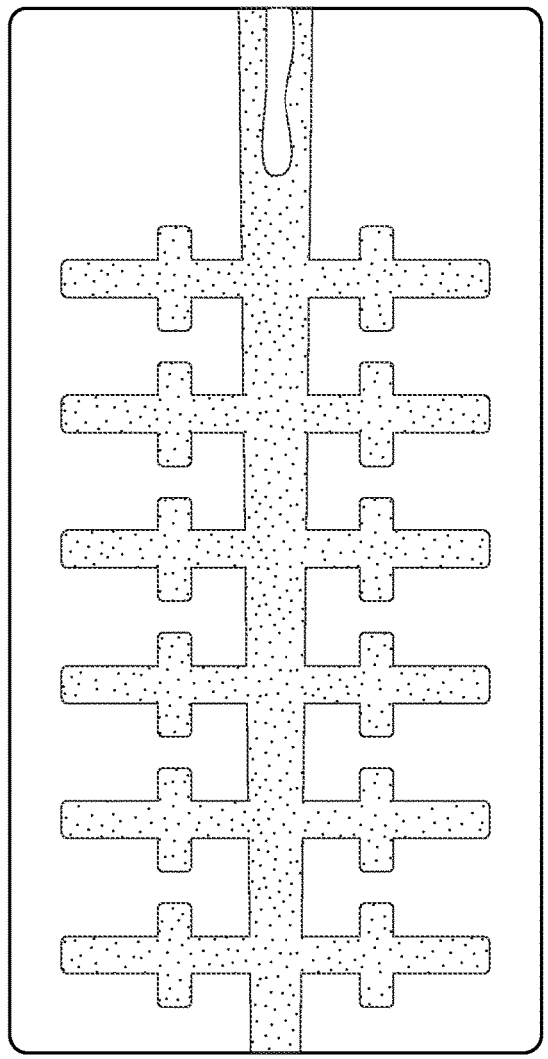
FIG. 17 depicts current endoactivator with endoactivator medium tip at 180 Hz and no continuous irrigation for 1 minute in simulated canal (irrigant applied at the beginning, after 30 seconds, and after 1 minute to remove debris).
Figure 17:
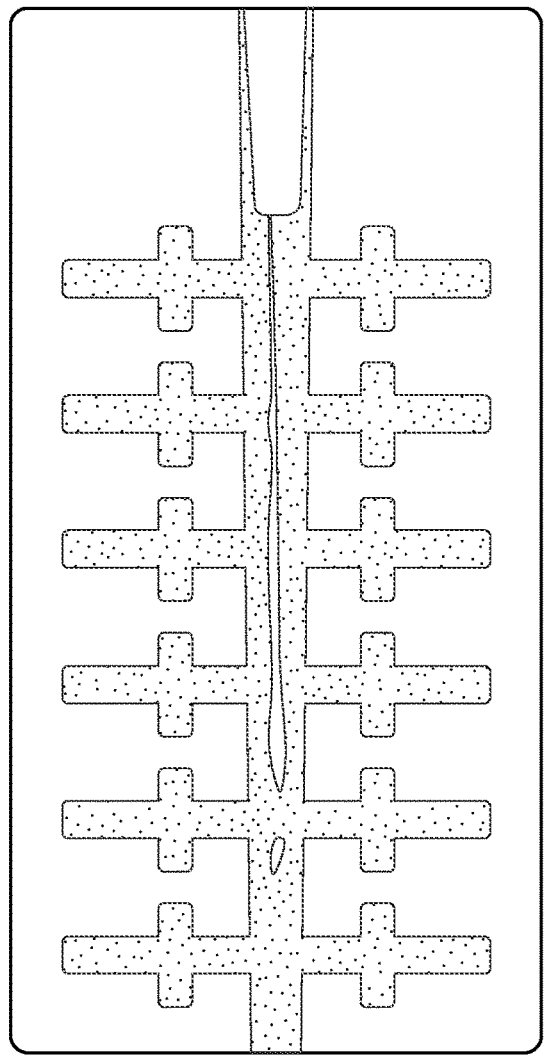

FIG. 17 shows the results for the standard EndoActivator with Medium Tip at 180 Hz and no continuous irrigation for 1 minute in simulated canal (irrigant applied at the beginning, after 30 seconds, and after 1 minute to remove debris). The results show that this is visually not as good as compared to FIG. 15 where oscillation and irrigation combined provided for a better cleaning.

Figure 18:
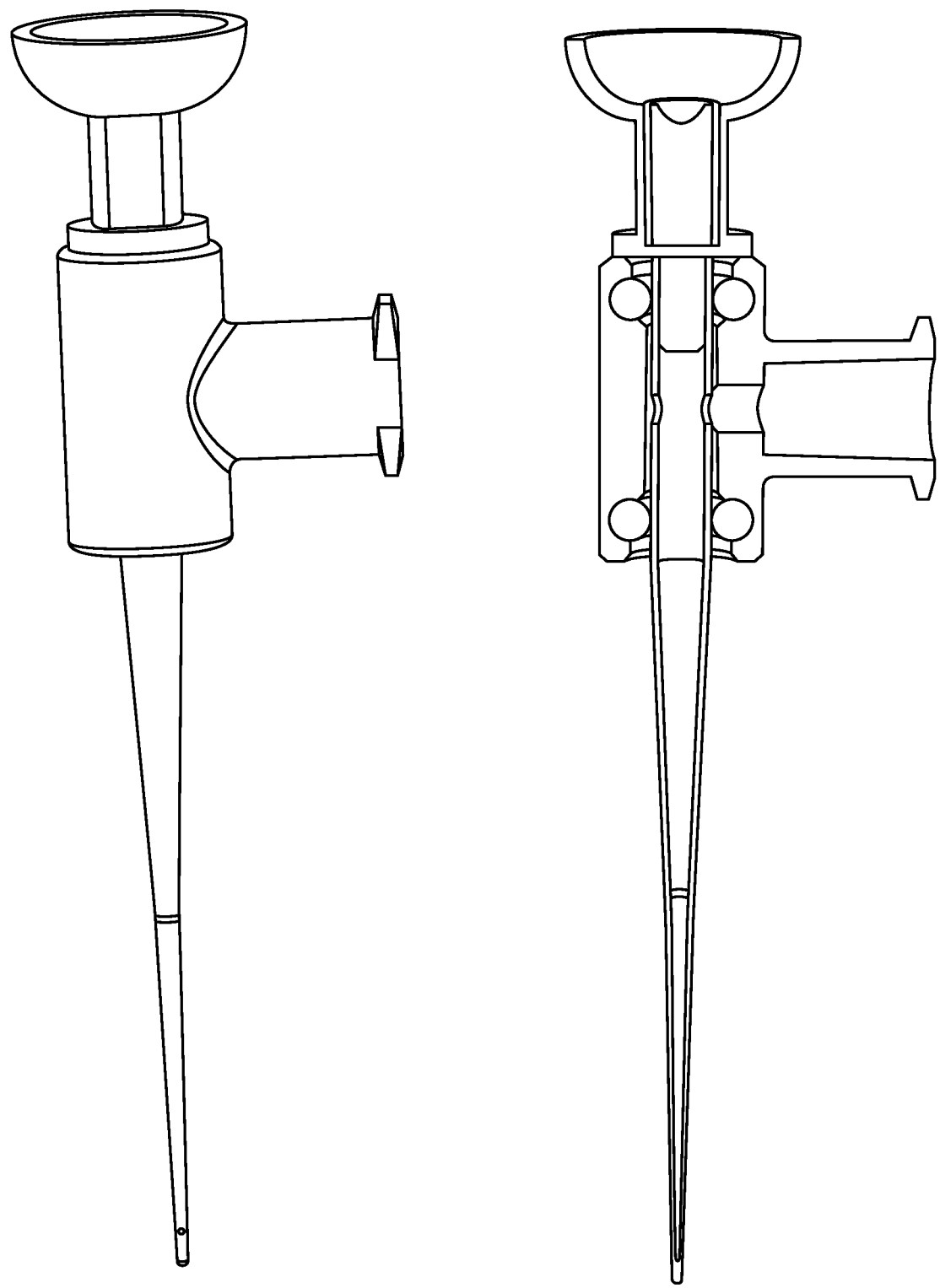
FIG. 18 depicts oscillating irrigation needle (non-rotating) with handle for sonic handpiece.

In an alternate embodiment of the present disclosure, when the irrigation needle is an oscillating needle, the connector is modular fluid delivery connector wherein there is no outer housing and bearings as shown in FIG. 18.

In one embodiment of the present disclosure, when the irrigation needle is an oscillating needle, the connector is a barbed connector (191) that is integrated with the irrigation needle (shown in FIG. 19).

While the present disclosure has been described with reference to one or more embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims. In addition, all numerical values identified in the detailed description shall be interpreted as though the precise and approximate values are both expressly identified.

The invention claimed is:

1. A dental device for delivering fluid continuously while activated in an endodontic application comprising:
a hollow needle, a handle and a removable modular fluid delivery connector; wherein the hollow needle includes a distal end portion, an intermediate portion, and a connector portion; the intermediate portion and a distal end portion together forms a working portion; the working portion terminates in a tip and is configured to act on a root canal; wherein the handle at one end is configured to be affixed to the connector portion of the hollow needle; wherein the handle at opposite end is capable of being attached to an endodontic handpiece or a sonic agitator for the activation,
wherein the hollow needle includes a plurality of openings on the connector portion and at least one opening on the distal end to allow fluid to be delivered through hollow needle, and
wherein a removable modular fluid delivery connector is coupled to the hollow needle, wherein the connector includes fluid delivery conduits for communicating the fluid to at least one opening of the plurality of opening of the hollow needle, wherein the modular fluid delivery connector comprises an inner housing, an outer housing; at least two sets of O rings and at least two ball bearing assemblies, wherein the at least two set of O rings include a smaller ID O ring set having a smaller inner diameter than a larger ID O ring set, wherein the smaller ID O ring set is configured to seal the needle to the inner housing of the modular fluid delivery connector, wherein the larger ID O ring set is configured to seal the inner housing modular fluid delivery connector and outer housing of the modular fluid delivery connector.

2. The dental device according to claim 1, wherein the modular fluid delivery connector is assembled to the device by at least partially enveloping the connector portion of the needle to allow fluid communication from the modular fluid delivery connector to the hollow needle.

3. The dental device according to claim 1, wherein the handle includes a stop that prevents a user from placing the modular fluid delivery connector any higher past the handle when the modular fluid delivery connector is assembled to the hollow needle and to align the at least one opening of the hollow needle with at least one opening of the modular fluid delivery connector.

4. The dental device according to claim 1, wherein the handle is connected to a standard endodontic handpiece.

5. The dental device according to claim 1, wherein the activation includes rotation of the hollow needle while expressing fluid outside of the hollow needle into the root canal.

6. The dental device according to claim 1, wherein the activation includes oscillation of the hollow needle while expressing fluid outside of the hollow needle into the root canal.

7. The dental device according to claim 1, wherein the ball bearing assemblies are used to align the inner and outer housing and allow them to freely rotate about each other.

8. The dental device according to claim 1, wherein the outer housing includes a luer lock connection which allows the fluid to be delivered from the luer lock of the outer housing and then to inner housing.

9. The dental device according to claim 1, wherein the inner housing further includes a fluid chamber configured to deliver pressurized fluid through the number of openings within the irrigation needle.

10. The dental device according to claim 1, wherein the hollow needle includes grooves configured to accept the smaller ID O rings in the inner housing of the modular fluid delivery connector.

11. The dental device according to claim 1, wherein the modular fluid delivery connector is made from stainless steel metal, plastic, or a combination thereof.

12. The dental device according to claim 1, the working portion of the irrigation needle is offset from an needle axis resulting in a general C-shape.

13. The dental device according to claim 12, wherein the working portion of the irrigation needle is offset from the needle in two-dimensional space.

14. The dental device according to claim 12, wherein the working portion extend from the needle axis in at least two different planes.

* * * * *